US012623687B2

(12) United States Patent
Cheng et al.

(10) Patent No.: US 12,623,687 B2
(45) Date of Patent: May 12, 2026

(54) METHOD AND APPARATUS FOR PLANNING OBSTACLE AVOIDANCE PATH OF TRAVELING APPARATUS

(71) Applicant: HUAWEI TECHNOLOGIES CO., LTD., Shenzhen (CN)

(72) Inventors: Siyuan Cheng, Beijing (CN); Chao Wang, Shanghai (CN); Xinyu Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

(21) Appl. No.: 18/156,703

(22) Filed: Jan. 19, 2023

(65) Prior Publication Data

US 2023/0159056 A1 May 25, 2023

Related U.S. Application Data

(63) Continuation of application No. PCT/CN2021/090523, filed on Apr. 28, 2021.

(30) Foreign Application Priority Data

Jul. 20, 2020 (CN) .......................... 202010699919.X

(51) Int. Cl.
*B60W 60/00* (2020.01)
*B60W 30/095* (2012.01)
*B60W 50/00* (2006.01)

(52) U.S. Cl.
CPC .... *B60W 60/0011* (2020.02); *B60W 30/0956* (2013.01); *B60W 50/0098* (2013.01);
(Continued)

(58) Field of Classification Search
CPC ......... B60W 60/0011; B60W 30/0956; B60W 50/0098; B60W 2050/0052;
(Continued)

(56) References Cited

U.S. PATENT DOCUMENTS 10,882,517 B2 * 1/2021 Ohl ........................ G08G 1/165
2007/0156286 A1 * 7/2007 Yamauchi ............ G05D 1/0278
700/245
(Continued)

FOREIGN PATENT DOCUMENTS

CN 102880186 A 1/2013
CN 103760904 A 4/2014
(Continued)

*Primary Examiner* — Mohamed Abdo Algehaim
(74) *Attorney, Agent, or Firm* — WOMBLE BOND DICKINSON (US) LLP

(57) ABSTRACT

The planning method includes: obtaining a distance map; determining a first horizontal background cost potential field in a near-field range based on the distance map, where the first horizontal background cost potential field is a first repulsion field formed by an obstacle at a horizontal location on the traveling apparatus, the first horizontal background cost potential field includes a target minimum-value point, background costs on two horizontal sides of the target minimum-value point feature monotonicity, and the background cost represents a near-field horizontal collision cost caused by the obstacle at the horizontal location in the near-field range to the traveling apparatus; and determining a current obstacle avoidance path based on the first horizontal background cost potential field. The method for planning an obstacle avoidance path in embodiments of this application enables the traveling apparatus to avoid an obstacle safely and stably in a complex and narrow traffic scenario.

20 Claims, 16 Drawing Sheets

(52) U.S. Cl.
CPC .............. *B60W 2050/0052* (2013.01); *B60W 2554/802* (2020.02); *B60W 2556/10* (2020.02)

(58) Field of Classification Search
CPC ....... B60W 2554/802; B60W 2556/10; B60W 2754/20; G01C 21/3446; G01C 21/3461; G05D 1/0223; G05D 1/0214; G05D 1/0221; G05D 1/0276
USPC ......................................................... 701/301
See application file for complete search history.

(56) References Cited

U.S. PATENT DOCUMENTS

| | | | | |
|---|---|---|---|---|
| 2015/0286219 | A1* | 10/2015 | Reichel | G08G 1/163 |
| | | | | 701/23 |
| 2018/0267540 | A1* | 9/2018 | Sonoura | B60W 60/0016 |
| 2019/0235512 | A1* | 8/2019 | Sinyavskiy | G05D 1/0217 |
| 2019/0317520 | A1* | 10/2019 | Zhang | G05D 1/0214 |
| 2020/0241541 | A1* | 7/2020 | McCawley | B60W 30/16 |
| 2021/0342605 | A1* | 11/2021 | Walessa | G06F 18/22 |
| 2022/0137227 | A1* | 5/2022 | Armstrong-Crews | |
| | | | | B60W 30/0956 |
| | | | | 701/26 |
| 2022/0153296 | A1* | 5/2022 | Yu | B60W 40/105 |
| 2022/0234580 | A1* | 7/2022 | Inaba | B60W 60/0013 |
| 2022/0276655 | A1* | 9/2022 | Takahashi | G05D 1/0088 |
| 2022/0342077 | A1* | 10/2022 | Chen | G06V 10/757 |
| 2023/0078294 | A1* | 3/2023 | Ishida | G08G 1/096716 |
| | | | | 701/25 |
| 2023/0079994 | A1* | 3/2023 | Ohashi | G06T 7/269 |
| | | | | 382/103 |
| 2023/0251098 | A1* | 8/2023 | Yano | G01C 21/206 |
| | | | | 701/527 |
| 2025/0033661 | A1* | 1/2025 | Wang | B62D 15/0285 |

FOREIGN PATENT DOCUMENTS

| | | | | | |
|---|---|---|---|---|---|
| CN | 105974917 | A | | 9/2016 | |
| CN | 107357293 | A | | 11/2017 | |
| CN | 108241370 | A | | 7/2018 | |
| CN | 108253984 | A | * | 7/2018 | ........ G01C 21/3446 |
| CN | 109557928 | A | | 4/2019 | |
| CN | 109947119 | A | | 6/2019 | |
| CN | 110077397 | A | | 8/2019 | |
| EP | 2806288 | A1 | | 11/2014 | |
| JP | 2005310043 | A | | 11/2005 | |
| JP | 2010061355 | A | | 3/2010 | |
| JP | 2011253302 | A | * | 12/2011 | |
| JP | 2018203034 | A | | 12/2018 | |
| JP | 2019006143 | A | | 1/2019 | |

* cited by examiner

400

Obtain a distance map

Determine a first horizontal background cost potential field in a near-field range based on the distance map Determine a current obstacle avoidance path based on the first horizontal background cost potential field Occupied map                    Distance map

S522

Optimal path of a    Historical path of
current frame    a previous frame

Optimal path of a    Historical path of a
current frame    previous frame

Final sampling goal point    Final sampling goal    Current optimal
of a previous frame    point obtained after    sampling goal point
time-domain smoothing

METHOD AND APPARATUS FOR PLANNING OBSTACLE AVOIDANCE PATH OF TRAVELING APPARATUS

CROSS-REFERENCE TO RELATED APPLICATIONS

This application is a continuation of International Application No. PCT/CN2021/090523, filed on Apr. 28, 2021, which claims priority to Chinese Patent Application No. 202010699919.X, filed on Jul. 20, 2020. The disclosures of the aforementioned applications are hereby incorporated by reference in their entireties.

TECHNICAL FIELD

This application relates to the field of autonomous driving technologies, and more specifically, to a method and an apparatus for planning an obstacle avoidance path of a traveling apparatus.

BACKGROUND

In an autonomous driving technology, navigation information is obtained by using a map and a positioning module, an ambient environment is sensed by using a sensing device, and autonomous vehicle navigation is implemented in combination with decision-making, planning, and control modules. In recent years, with rapid development of computer vision, artificial intelligence, and sensing devices, the autonomous driving technology has been developed rapidly, and has been widely used in both military and civil fields. In an autonomous driving apparatus, a path planning module is responsible for outputting a correct and effective traveling path based on upper-layer navigation information, a decision instruction, and an environment perception result, to guide correct driving of the autonomous driving apparatus. In addition, the path planning module can further implement planning of an obstacle avoidance path based on obstacle information, to enable the autonomous driving apparatus to travel safely in a dynamic environment. This is also a work focus of path planning.

Existing methods for planning an obstacle avoidance path mainly include methods respectively based on sampling, optimization, searching, potential fields, feature points, and the like. These methods for planning an obstacle avoidance path usually have a relatively good planning effect in a simple scenario, but encounter path shaking in a real dynamic traffic scenario, especially a complex and narrow scenario, and therefore cannot ensure safe and stable traveling of a vehicle.

Therefore, in case of a complex and narrow traffic scenario, how to output a safe and stable obstacle avoidance path by using a same planning method is a problem that urgently needs to be resolved at present.

SUMMARY

This application provides a method and an apparatus for planning an obstacle avoidance path of a traveling apparatus, to enable the traveling apparatus to avoid an obstacle safely and stably in a complex and narrow traffic scenario.

According to a first aspect, a method for planning an obstacle avoidance path of a traveling apparatus is provided, including: obtaining a distance map, where the distance map includes a plurality of first grids, each of the plurality of first grids is used to record a distance from the first grid to a closest first grid occupied by an obstacle; determining a first horizontal background cost potential field in a near-field range based on the distance map, where the near-field range is a range in which a longitudinal distance from the traveling apparatus is less than or equal to a first threshold, the first horizontal background cost potential field is a first repulsion field formed by an obstacle at a horizontal location on the traveling apparatus, the first horizontal background cost potential field includes a target minimum-value point, background costs on two horizontal sides of the target minimum-value point feature monotonicity, and the background cost represents a near-field horizontal collision cost caused by the obstacle at the horizontal location in the near-field range to the traveling apparatus; and determining a current obstacle avoidance path based on the first horizontal background cost potential field.

In an embodiment, the foregoing traveling apparatus may be an autonomous vehicle, a robot, or another autonomous traveling apparatus.

It should be understood that, a repulsion field is formed by an obstacle at a horizontal location on the traveling apparatus, can indicate a trend of collision by the obstacle with the traveling apparatus, can guide the traveling apparatus to avoid the obstacle, and may also be referred to as a collision field or a risk field. The first horizontal background cost potential field includes the target minimum-value point. The background costs on the two horizontal sides of the target minimum-value point feature monotonicity. To be specific, this means that the background costs on the two horizontal sides of the target minimum-value point in the first repulsion field feature monotonicity.

It should be understood that the background costs on the two sides of the target minimum-value point feature monotonicity. Specifically, a potential field on a left side of the target minimum-value point is monotonically decreasing, and a potential field on a right side of the target minimum-value point is monotonically increasing.

It should be understood that the background costs on the two horizontal sides of the target minimum-value point feature monotonicity. This means that the background costs on the two horizontal sides of the target minimum-value point each are greater than a background cost at the target minimum-value point.

In an embodiment, the first horizontal background cost potential field may be V-shaped.

In an embodiment, the determining a current obstacle avoidance path based on the first horizontal background cost potential field may be determining the current obstacle avoidance path based on a horizontal location of the target minimum-value point in the first horizontal background cost potential field.

In this embodiment of this application, the distance map is first obtained, then the first horizontal background cost potential field in the near-field range is constructed based on the distance map, and the first horizontal background cost potential field includes the target minimum-value point, and the background costs on the two horizontal sides of the target minimum-value point feature monotonicity; and then the current obstacle avoidance path is determined based on the first horizontal background cost potential field. In this way, during obstacle avoidance path planning, information about a near-field obstacle is fully considered, to prevent a distant obstacle from affecting the planned path. In addition, the first horizontal background cost potential field in the near-field range is constructed, to effectively reflect a trend of horizontal collision between the traveling apparatus and the obstacle. The obstacle avoidance path planned on this basis can enable the traveling apparatus to keep an optimal horizontal distance from the obstacle in a complex and narrow environment, thereby improving stability of the obstacle avoidance path.

In an embodiment, the determining a first horizontal background cost potential field in a near-field range based on the distance map includes: determining a second horizontal background cost potential field in the near-field range based on the distance map, where the second horizontal background cost potential field is a second repulsion field formed by the obstacle at the horizontal location on the traveling apparatus, and the second horizontal background cost potential field includes at least one minimum-value point; determining the target minimum-value point from the at least one minimum-value point; and performing monotonicity processing on the background costs on the two horizontal sides of the target minimum-value point, to generate the first horizontal background cost potential field, where a slope of the monotonicity processing is greater than or equal to a second threshold.

It should be understood that the second repulsion field can indicate a trend of collision by the obstacle with the traveling apparatus before monotonicity processing is performed. In other words, the first repulsion field is obtained after monotonicity processing is performed on the second repulsion field.

In this embodiment of this application, the second horizontal background cost potential field in the near-field range is first constructed based on the distance map, then one target minimum-value point is determined from the at least one minimum-value point in the second horizontal background cost potential field, and monotonicity processing is performed on the background costs on the two horizontal sides of the target minimum-value point, to generate the first horizontal background cost potential field, and the slope of the monotonicity processing is greater than or equal to the second threshold. In this way, a background cost potential field at the horizontal location of the target minimum-value point is obviously lower than a background cost potential field at another horizontal location. When an obstacle on a side of the traveling apparatus slightly approaches in a horizontal direction, a background cost potential field at a horizontal location of the traveling apparatus significantly increases, so that the traveling apparatus avoids the obstacle slowly and stably and moves to a horizontal location with a lowest background cost potential field, to ensure that a safe distance is kept from the obstacle.

In an embodiment, there is no obstacle between the target minimum-value point and the traveling apparatus.

In other words, in the near-field range, there is no obstacle between the horizontal location of the target minimum-value point and the horizontal location of the traveling apparatus.

In an embodiment, the target minimum-value point may be a smallest minimum-value point in all minimum-value points between which and the traveling apparatus there is no obstacle in the near-field range.

In this embodiment of this application, there is no obstacle between the target minimum-value point and the traveling apparatus, so that an ego vehicle can stably move to the horizontal location of the target minimum-value point, to avoid a failure of the ego vehicle in moving to the horizontal location of the target minimum-value point that is caused by an obstacle between the traveling apparatus and the horizontal location of the target minimum-value point, thereby improving stability of the path.

In an embodiment, before the obtaining a distance map, the method further includes: obtaining an occupied map, where the occupied map includes a plurality of second grids, and each of the plurality of second grids is used to record a probability that there is an obstacle in the second grid; and the obtaining a distance map includes: obtaining the distance map based on the occupied map.

In an embodiment, when the probability that there is an obstacle in the second grid is greater than or equal to a particular threshold, it may be considered that there is an obstacle in the second grid; or when the probability that there is an obstacle in the second grid is less than a particular threshold, it may be considered that there is no obstacle in the second grid.

In an embodiment, each of the plurality of second grids may be further directly used to record whether there is an obstacle in the second grid.

In an embodiment, the obtaining the distance map based on the occupied map includes: filtering out the second grid located in a first zone in the occupied map, where the first zone is located in front of the traveling apparatus, and if there is an obstacle in the first zone, the traveling apparatus is incapable of avoiding the obstacle in the first zone; and obtaining the distance map based on the occupied map obtained after the filtering-out is performed.

It should be understood that, "if there is an obstacle in the first zone, the traveling apparatus is incapable of avoiding the obstacle in the first zone" may also be described as: If there is an obstacle in the first zone, the traveling apparatus cannot avoid the obstacle in the first zone regardless of which obstacle avoidance path is selected by the traveling apparatus.

In a specific zone range in front of the vehicle, the traveling apparatus cannot avoid an obstacle in the zone regardless of which obstacle avoidance path is selected by the traveling apparatus. In addition, obstacle avoidance path planning is performed based on occupied-map information provided by an upstream module, and obstacle information provided by the upstream module not only includes an actual pose of a dynamic or static obstacle and a predicted track projection of the obstacle, but also may include an obstacle occupation situation caused by false detection on a head part of the ego vehicle, or a situation in which ground unevenness causes the occupied map to have obstacle information in this zone. Therefore, in this case, if the obstacle in this zone is still considered, path planning is affected. Consequently, the obstacle in this zone always needs to be avoided in a traveling process, causing sharp oscillation of the path. Therefore, in this embodiment of this application, before the distance map is obtained, the grid located in this zone in the occupied map may be first filtered out. In this way, the traveling apparatus is effectively prevented from performing unreasonable avoidance due to false detection of an obstacle. This ensures that remaining occupied grids include only necessary information required by an obstacle avoidance algorithm, thereby ensuring stability of the obstacle avoidance path.

In an embodiment, before the determining a second horizontal background cost potential field in the near-field range based on the distance map, the method further includes: generating a feature vector, where the feature vector includes a path start point and a sampling goal point; and generating a plurality of candidate paths based on a reference path, a historical path, and the feature vector; and the determining a second horizontal background cost potential field in the near-field range based on the distance map includes: shifting the reference path horizontally based on the sampling goal point, to generate a plurality of virtual parallel paths; calculating, based on the distance map, a distance from each road point on each of the plurality of virtual parallel paths in the near-field range to a closest obstacle; calculating a background cost of each virtual parallel path based on a minimum value of the distance on the virtual parallel path; and generating the second horizontal background cost potential field in the near-field range based on the background costs of the plurality of virtual parallel paths in the near-field range.

In an embodiment, before the determining a current obstacle avoidance path based on the first horizontal background cost potential field, the method further includes: calculating, based on the distance map, one or more of a collision cost, a constraint cost, a switching cost, a horizontal shift cost, or a smoothness cost on each of the plurality of candidate paths, where the collision cost is used to evaluate whether the traveling apparatus collides when traveling on the candidate path, the constraint cost is used to evaluate whether each road point on the candidate path is in an obstacle avoidable range, the switching cost is used to evaluate a deviation between the candidate path and the historical path, the horizontal shift cost is used to evaluate a degree of a horizontal shift of the candidate path from a road centerline, and the smoothness cost is used to evaluate smoothness of the candidate path; and the determining a current obstacle avoidance path based on the first horizontal background cost potential field includes: calculating a final cost on each candidate path based on a background cost in the first horizontal background cost potential field, or based on a background cost in the first horizontal background cost potential field and one or more of the collision cost, the constraint cost, the switching cost, the horizontal shift cost, or the smoothness cost; and determining the current obstacle avoidance path based on the final cost.

In this embodiment of this application, when the current obstacle avoidance path is determined, in addition to the background cost, one or more of the collision cost, the constraint cost, the switching cost, the horizontal shift cost, or the smoothness cost may be further considered, so that the determined obstacle avoidance path can cover more factors, thereby further improving stability and safety of the obstacle avoidance path.

In an embodiment, the method further includes: determining a final obstacle avoidance path based on an arbitration result between the historical path and the current obstacle avoidance path.

In this embodiment of this application, when the current obstacle avoidance path is determined, the final obstacle avoidance path is determined based on a difference between the current obstacle avoidance path and the historical path. This avoids a case in which an obstacle avoidance path obtained based on only a cost function or pure logic during operation in a complex and narrow environment generates interframe hopping, and effectively alleviates dependence of the planning method on the cost function, thereby ensuring stability of the path.

In an embodiment, the determining a final obstacle avoidance path based on an arbitration result between the historical path and the current obstacle avoidance path includes: using the current obstacle avoidance path as the final obstacle avoidance path if collision occurs on the historical path but not on the current obstacle avoidance path; or using a path with a larger collision distance in the current obstacle avoidance path and the historical path as the final obstacle avoidance path if collision occurs on both the historical path and the current obstacle avoidance path and an absolute value of a difference between a collision distance of the current obstacle avoidance path and a collision distance of the historical path is greater than or equal to a third threshold; or using the historical path as the final obstacle avoidance path if collision occurs on both the historical path and the current obstacle avoidance path and an absolute value of a difference between a collision distance of the current obstacle avoidance path and a collision distance of the historical path is less than a third threshold; or using the current obstacle avoidance path as the final obstacle avoidance path if no collision occurs on the historical path and a ratio of the final cost of the current obstacle avoidance path to a cost of the historical path is less than or equal to a fourth threshold; or using the historical path as the final obstacle avoidance path if no collision occurs on the historical path and a ratio of the final cost of the current obstacle avoidance path to a cost of the historical path is greater than a fourth threshold, where the collision distance is a shortest longitudinal distance in longitudinal distances of all road points in a collision state on each candidate path.

In this embodiment of this application, if the current obstacle avoidance path is obviously superior to the historical path, the current obstacle avoidance path is switched to; or if the current obstacle avoidance path is not obviously superior to the historical path, the historical path is still used. This avoids a case in which an obstacle avoidance path obtained based on only a cost function or pure logic during operation in a complex and narrow environment generates interframe hopping, thereby ensuring stability of the path.

In an embodiment, the method further includes: performing time-domain smoothing based on the historical path and the final obstacle avoidance path.

In this embodiment of this application, when the final obstacle avoidance path is obtained, time-domain smoothing may be further performed based on the historical path and the final obstacle avoidance path. In this case, if the final obstacle avoidance path is still the historical path, the obstacle avoidance path obtained after the time-domain smoothing is still the historical path; or if the final obstacle avoidance path is the current obstacle avoidance path, time-domain smoothing is performed based on the current obstacle avoidance path and the historical path. This effectively avoids a case in which interframe hopping is generated during obstacle avoidance path switching in a complex and narrow environment, thereby ensuring stability of the path.

In an embodiment, the method further includes: outputting the final obstacle avoidance path to a speed planner, where the speed planner is configured to perform speed planning based on the final obstacle avoidance path and obstacle information on the final obstacle avoidance path.

In this embodiment of this application, after the final obstacle avoidance path is output, the speed planner performs speed planning based on the obstacle information on the final obstacle avoidance path, and performs deceleration planning if an obstacle that may cause collision is discovered on the path, thereby improving safety of the path.

According to a second aspect, an apparatus for planning an obstacle avoidance path of a traveling apparatus is provided. The apparatus includes an obtaining module and a processing module. The obtaining module is configured to obtain a distance map, where the distance map includes a plurality of first grids, each of the plurality of first grids is used to record a distance from the first grid to a closest first grid occupied by an obstacle; and the processing module is configured to: determine a first horizontal background cost potential field in a near-field range based on the distance map, where the near-field range is a range in which a longitudinal distance from the traveling apparatus is less than or equal to a first threshold, the first horizontal background cost potential field is a first repulsion field formed by an obstacle at a horizontal location on the traveling apparatus, the first horizontal background cost potential field includes a target minimum-value point, background costs on two horizontal sides of the target minimum-value point feature monotonicity, and the background cost represents a near-field horizontal collision cost caused by the obstacle at the horizontal location in the near-field range to the traveling apparatus; and determine a current obstacle avoidance path based on the first horizontal background cost potential field.

In an embodiment, the determining a first horizontal background cost potential field in a near-field range based on the distance map includes: determining a second horizontal background cost potential field in the near-field range based on the distance map, where the second horizontal background cost potential field is a second repulsion field formed by the obstacle at the horizontal location on the traveling apparatus, and the second horizontal background cost potential field includes at least one minimum-value point; determining the target minimum-value point from the at least one minimum-value point; and performing monotonicity processing on the background costs on the two horizontal sides of the target minimum-value point, to generate the first horizontal background cost potential field, where a slope of the monotonicity processing is greater than or equal to a second threshold.

In an embodiment, there is no obstacle between the target minimum-value point and the traveling apparatus.

In an embodiment, before the obtaining a distance map, the obtaining module is further configured to: obtain an occupied map, where the occupied map includes a plurality of second grids, and each of the plurality of second grids is used to record a probability that there is an obstacle in the second grid; and the processing module is further configured to: obtain the distance map based on the occupied map.

In an embodiment, the obtaining the distance map based on the occupied map includes: filtering out the second grid located in a first zone in the occupied map, where the first zone is located in front of the traveling apparatus, and if there is an obstacle in the first zone, the traveling apparatus is incapable of avoiding the obstacle in the first zone; and obtaining the distance map based on the occupied map obtained after the filtering-out is performed.

In an embodiment, before the determining a second horizontal background cost potential field in the near-field range based on the distance map, the processing module is further configured to: generate a feature vector, where the feature vector includes a path start point and a sampling goal point; and generate a plurality of candidate paths based on a reference path, a historical path, and the feature vector; and the determining a second horizontal background cost potential field in the near-field range based on the distance map includes: shifting the reference path horizontally based on the sampling goal point, to generate a plurality of virtual parallel paths; calculating, based on the distance map, a distance from each road point on each of the plurality of virtual parallel paths in the near-field range to a closest obstacle; calculating a background cost of each virtual parallel path based on a minimum value of the distance on the virtual parallel path; and generating the second horizontal background cost potential field in the near-field range based on the background costs of the plurality of virtual parallel paths in the near-field range.

In an embodiment, before the determining a current obstacle avoidance path based on the first horizontal background cost potential field, the processing module is further configured to: calculate, based on the distance map, one or more of a collision cost, a constraint cost, a switching cost, a horizontal shift cost, or a smoothness cost on each of the plurality of candidate paths, where the collision cost is used to evaluate whether the traveling apparatus collides when traveling on the candidate path, the constraint cost is used to evaluate whether each road point on the candidate path is in an obstacle avoidable range, the switching cost is used to evaluate a deviation between the candidate path and the historical path, the horizontal shift cost is used to evaluate a degree of a horizontal shift of the candidate path from a road centerline, and the smoothness cost is used to evaluate smoothness of the candidate path; and the determining a current obstacle avoidance path based on the first horizontal background cost potential field includes: calculating a final cost on each candidate path based on a background cost in the first horizontal background cost potential field, or based on a background cost in the first horizontal background cost potential field and one or more of the collision cost, the constraint cost, the switching cost, the horizontal shift cost, or the smoothness cost; and determining the current obstacle avoidance path based on the final cost.

In an embodiment, the processing module is further configured to: determine a final obstacle avoidance path based on an arbitration result between the historical path and the current obstacle avoidance path.

In an embodiment, the determining a final obstacle avoidance path based on an arbitration result between the historical path and the current obstacle avoidance path includes: using the current obstacle avoidance path as the final obstacle avoidance path if collision occurs on the historical path but not on the current obstacle avoidance path; or using a path with a larger collision distance in the current obstacle avoidance path and the historical path as the final obstacle avoidance path if collision occurs on both the historical path and the current obstacle avoidance path and an absolute value of a difference between a collision distance of the current obstacle avoidance path and a collision distance of the historical path is greater than or equal to a third threshold; or using the historical path as the final obstacle avoidance path if collision occurs on both the historical path and the current obstacle avoidance path and an absolute value of a difference between a collision distance of the current obstacle avoidance path and a collision distance of the historical path is less than a third threshold; or using the current obstacle avoidance path as the final obstacle avoidance path if no collision occurs on the historical path and a ratio of the final cost of the current obstacle avoidance path to a cost of the historical path is less than or equal to a fourth threshold; or using the historical path as the final obstacle avoidance path if no collision occurs on the historical path and a ratio of the final cost of the current obstacle avoidance path to a cost of the historical path is greater than a fourth threshold, where the collision distance is a shortest longitudinal distance in longitudinal distances of all road points in a collision state on each candidate path.

In an embodiment, the processing module is further configured to perform time-domain smoothing based on the historical path and the final obstacle avoidance path.

In an embodiment, the apparatus may further include an output module, configured to output the final obstacle avoidance path to a speed planner, where the speed planner is configured to perform speed planning based on the final obstacle avoidance path and obstacle information on the final obstacle avoidance path.

According to a third aspect, a planning apparatus is provided, including an input/output interface, a processor, and a memory. The processor is configured to control the input/output interface to receive and send signals or information. The memory is configured to store a computer program. The processor is configured to: invoke the computer program from the memory and run the computer program, to enable the planning apparatus to perform the method in the first aspect.

According to a fourth aspect, a vehicle is provided, including various modules configured to perform the method in the first aspect.

According to a fifth aspect, a computer-readable medium is provided. The computer-readable medium stores program code. When run on a computer, the computer program code enables the computer to perform the method in the first aspect.

According to a sixth aspect, a chip is provided. The chip includes a processor and a data interface. The processor reads, through the data interface, instructions stored in a memory, to perform the method in the first aspect.

In an embodiment, the chip may further include the memory. The memory stores the instructions. The processor is configured to execute the instructions stored in the memory. When the instructions are executed, the processor is configured to perform the method in the first aspect.

The chip may be specifically a field programmable gate array (FPGA) or an application-specific integrated circuit ASIC.

It should be understood that, in this application, the method in the first aspect may be specifically the method in any one of the first aspect or the implementations of the first aspect.

DESCRIPTION OF EMBODIMENTS

For ease of understanding, some technical terms in embodiments of this application are first described.

Path planning: In an autonomous traveling process, an autonomous driving apparatus outputs a correct and effective traveling path based on upper-layer navigation information, a decision instruction, and an environment perception result, and the traveling path is used as a main input of a lower-layer controller, to guide correct traveling of a vehicle, thereby completing a plurality of actions such as lane keeping, lane changing, and obstacle avoidance. A process of generating the path is referred to as path planning. It should be understood that, in embodiments of this application, for ease of description, an ego vehicle is used to represent the autonomous driving apparatus.

Occupied map: including grids, also referred to as an occupied grid map. The occupied map includes obstacle information in a given zone near the ego vehicle. A grid value may represent occupied, unoccupied, unknown, and another state.

Reference path: a basis of reference used by the ego vehicle for path planning, such as a centerline of a current road. This path mainly reflects real map information and can guide a traveling direction of the ego vehicle, but has no obstacle avoidance function.

Obstacle avoidable range: a traveling range around the reference path. It is used by the ego vehicle for obstacle avoidance, and provides a space constraint for obstacle avoidance path planning.

Avoidance path: a path on which an obstacle can be avoided and that is obtained through path planning by the ego vehicle based on obstacle information and based on the reference path and the obstacle avoidable range.

Figure 1:
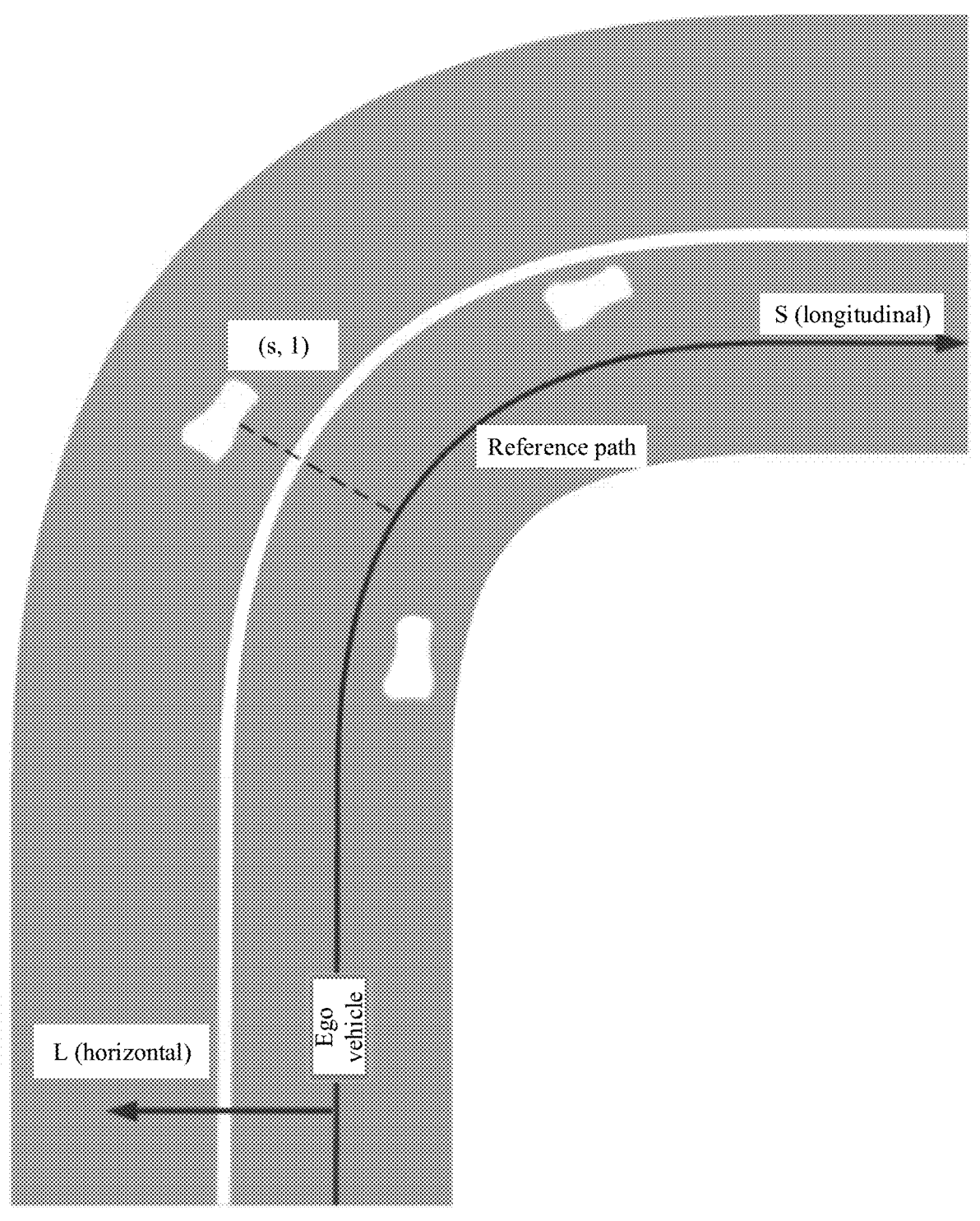
FIG. 1 is an example diagram of a Frenet coordinate system according to an embodiment of this application.

Frenet coordinate system (SL system): FIG. 1 is an example diagram of a Frenet coordinate system according to an embodiment of this application. As shown in FIG. 1, a middle point of a rear axle of an ego vehicle is used as an origin of the SL system. A direction along a reference path is referred to as a longitudinal direction (S direction). A direction perpendicular to the path is referred to as a horizontal direction (L direction). The reference path is a centerline of a road.

For ease of understanding, the background of embodiments of this application is further described in detail.

In an autonomous driving technology, navigation information is obtained by using a map and a positioning module, an ambient environment is sensed by using a sensing device, and autonomous vehicle navigation is implemented in combination with decision-making, planning, and control modules. In recent years, with rapid development of computer vision, artificial intelligence, and sensing devices, the autonomous driving technology has been developed rapidly, and has been widely used in both military and civil fields.

In modules of an autonomous vehicle, a planning module is responsible for outputting a correct and effective traveling path based on navigation information, a decision instruction, and an environment perception result, to implement actions such as lane keeping, lane changing, and obstacle avoidance of the vehicle. There is usually a reference path in the path planning module. The reference path may be generated based on a centerline of a current road or obtained in a manner of manual acquisition, and mainly provides reference for path planning for the autonomous vehicle. Based on the reference path in combination with obstacle information, obstacle avoidance path planning of the vehicle needs to be further implemented, to implement safe traveling of the vehicle in a dynamic environment. This is also a work focus of path planning.

At present, common methods for planning an obstacle avoidance path include methods respectively based on sampling, optimization, searching, potential fields, feature points, and the like. Main characteristics of the methods are as follows: A sampling-based obstacle avoidance method is efficient in calculation and is convenient for engineered transformation, but usually cannot achieve an optimal solution, and a jitter may occur in a complex scenario. An optimization-based method can fully consider input information to obtain an approximate theoretical optimal solution, but consumes computing resources and is easily affected by an environment. For example, a change of an obstacle distant from the ego vehicle directly affects a path near the ego vehicle, and therefore the ego vehicle encounters jitters or oscillation when traveling in a dynamic environment. A searching-based method can deal with a complex scenario, but consumes a large quantity of computing resources and easily generates unsmooth planned paths. This method is usually suitable only for a low-speed scenario, and does not support a dynamic scenario well enough. A potential field-based method can comprehensively consider obstacle information in an environment, but encounters local bending and oscillation. A feature point-based method generates a stable and effective obstacle avoidance path in a simple low-speed scenario, but encounters obvious oscillation in a complex dynamic scenario.

In conclusion, the existing methods for planning an obstacle avoidance path usually have a relatively good planning effect in a simple scenario, but encounter path shaking in a real dynamic traffic scenario, especially in a complex and narrow scenario, and therefore cannot ensure safe and stable traveling of a vehicle.

For the problem in the conventional technology, in embodiments of this application, a first horizontal background cost potential field in a near-field range is constructed, and background costs on two horizontal sides of a target minimum-value point in the first horizontal background cost potential field feature monotonicity. This effectively reflects a trend of horizontal collision between an ego vehicle and an obstacle. An obstacle avoidance path planned on this basis can enable a traveling apparatus to keep an optimal horizontal distance from the obstacle in a complex and narrow environment, and also prevent the planned obstacle avoidance path from being affected by a change in a relatively distant environment, thereby improving stability of the obstacle avoidance path.

For better understanding of solutions in embodiments of this application, before a method is described, scenarios and system architectures to which embodiments of this application can be applied are first simply described with reference to the accompanying drawings.

Figure 2:
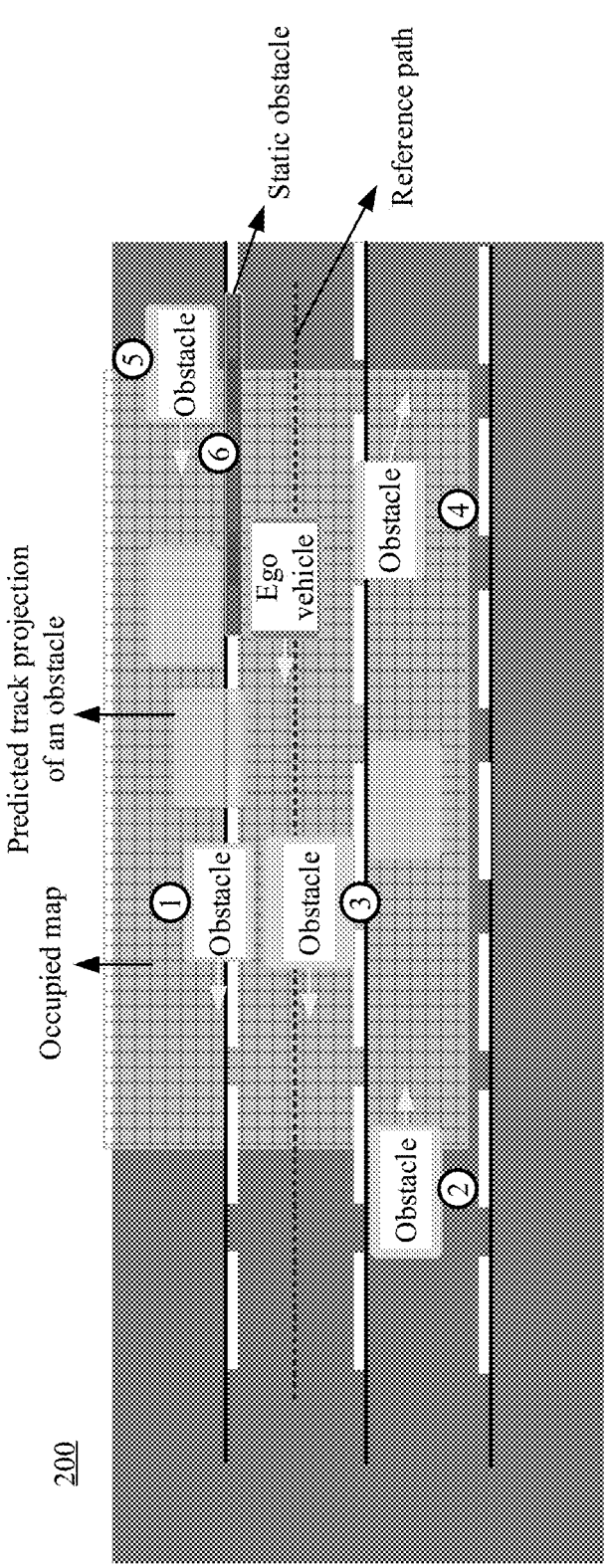
FIG. 2 is an example diagram of a complex and narrow city road scenario according to an embodiment of this application.

FIG. 2 is an example diagram of a complex and narrow city road scenario according to an embodiment of this application. As shown in FIG. 2, when an ego vehicle travels on a road, a large quantity of dynamic obstacles (numbered 1 to 5) and/or static obstacles (numbered 6) occur in an obstacle avoidable range. This constitutes a narrow and congested traffic scenario. The static obstacles may be vehicles parked on both sides of the road or other obstacles placed on both sides of the road, or may be other obstacles temporarily placed on the road. The dynamic obstacles may be other vehicles traveling in the obstacle avoidable range of the ego vehicle. Under impact of the foregoing obstacles, a space for traveling of the ego vehicle is narrow and a traveling path is complex. It should be understood that, in this scenario, a reference path, a horizontal obstacle avoidable range, sizes, locations, and speeds of all the obstacles, and an occupied map including predicted track projections are all known.

Figures 3, 4:
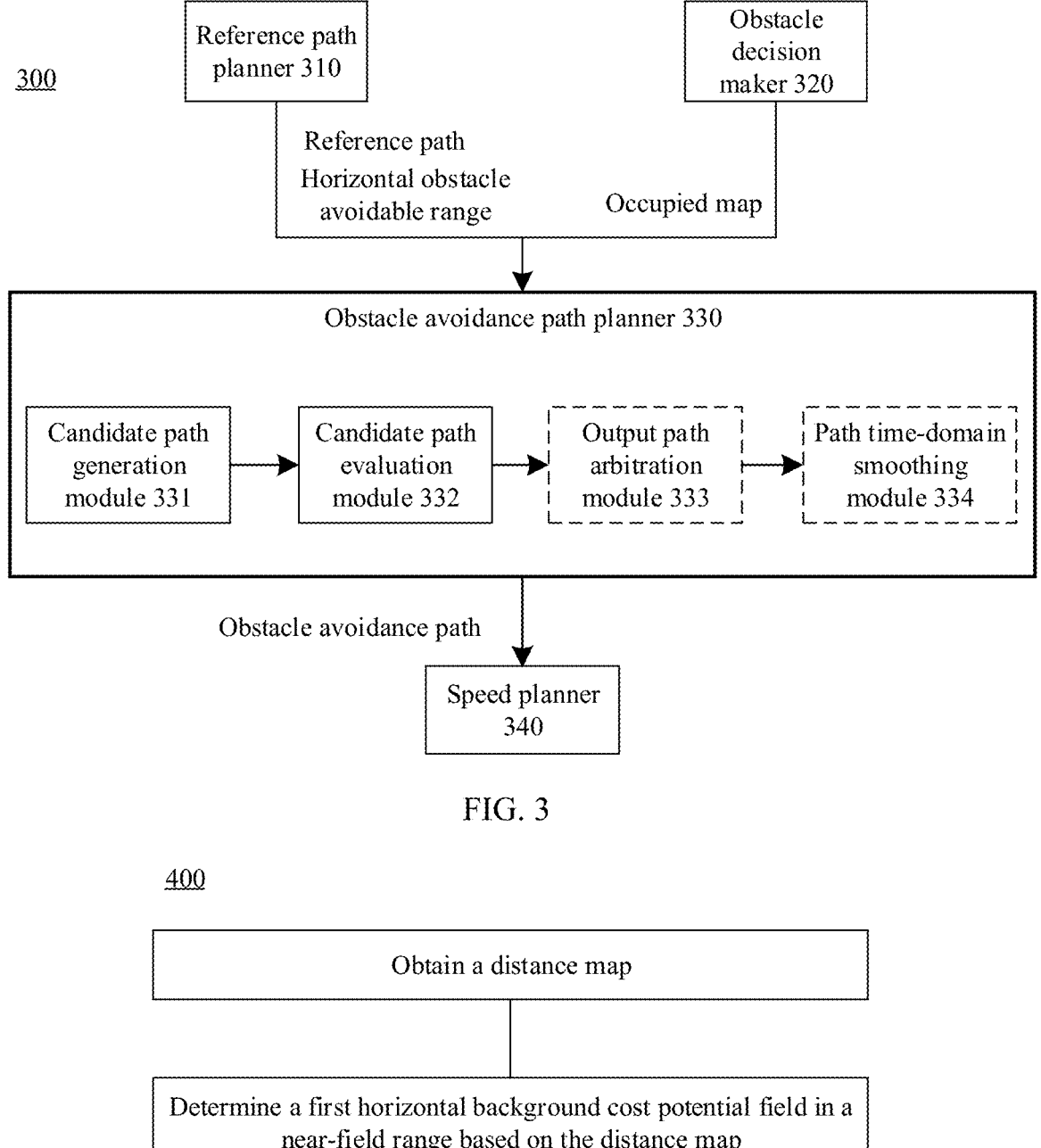
FIG. 3 is an example diagram of a system architecture for planning an obstacle avoidance path according to an embodiment of this application.
FIG. 4 is an example diagram of a method for planning an obstacle avoidance path of a traveling apparatus according to an embodiment of this application.

FIG. 3 is an example diagram of a system architecture for planning an obstacle avoidance path according to an embodiment of this application. The system architecture 300 includes a reference path planner 310, an obstacle decision maker 320, an obstacle avoidance path planner 330, and a speed planner 340.

The reference path planner 310 is configured to provide a reference path and a horizontal obstacle avoidable range for the obstacle avoidance path planner 330. In this embodiment of this application, the reference path is a centerline of a road. It should be understood that the reference path may also be presented in another form. This is not limited herein. The horizontal obstacle avoidable range is a range in which obstacle avoidance can be performed in a direction perpendicular to the path in a traveling process of the ego vehicle. For example, the horizontal obstacle avoidable range may be a width of a road on which the ego vehicle currently travels.

The obstacle decision maker 320 is configured to provide the obstacle avoidance path planner 330 with an occupied map including an obstacle and a predicted track projection of the obstacle. It should be understood that, a manner in which the obstacle decision maker 320 obtains the occupied map including the obstacle and the predicted track projection of the obstacle is not limited in this application.

The obstacle avoidance path planner 330 is configured to plan an obstacle avoidance path based on the reference path and the horizontal obstacle avoidable range that are provided by the reference path planner 310 and the occupied map including the obstacle and the predicted track projection of the obstacle that is provided by the obstacle decision maker 320.

In this embodiment of this application, the obstacle avoidance path planner 330 includes a candidate path generation module 331 and a candidate path evaluation module 332. The candidate path generation module 331 is configured to generate a cluster of candidate paths based on the reference path and the horizontal obstacle avoidable range. A manner of generating the candidate paths is described in detail below, and details are not described herein. The candidate path evaluation module 332 is configured to: evaluate a candidate path based on the candidate path itself and occupation information of an obstacle, and select an optimal path of a current frame as a current obstacle avoidance path.

In an embodiment, the optimal path of the current frame selected by the candidate path evaluation module 332 may be used as a currently output obstacle avoidance path. In another embodiment, the obstacle avoidance path planner 330 may further include an output path arbitration module 433, configured to determine a finally output obstacle avoidance path based on the optimal path of the current frame and a historical path (of a previous frame).

In an embodiment, the obstacle avoidance path planner 330 may further include a path time-domain smoothing module 334, configured to perform time-domain smoothing on the finally output obstacle avoidance path.

The obstacle avoidance path planner 330 outputs the planned obstacle avoidance path to the back-end speed planner 340. If there is a possibility of collision between the ego vehicle and the obstacle on the obstacle avoidance path, the speed planner plans deceleration based on a location and speed of the collision obstacle relative to the ego vehicle.

FIG. 4 is an example diagram of a method for planning an obstacle avoidance path of a traveling apparatus according to an embodiment of this application. It should be understood that the method 400 may be applied to the foregoing scenario 200, or may be applied to the foregoing system architecture 300. As shown in FIG. 4, the method 400 includes operations S410 to S430. The following describes these operations in detail.

Operation S410: Obtain a distance map.

The distance map includes a plurality of first grids, each of the plurality of first grids is used to record a distance from the first grid to a closest first grid occupied by an obstacle.

In an embodiment, before the obtaining a distance map, the method 400 further includes: obtaining an occupied map, where the occupied map includes a plurality of second grids, and each of the plurality of second grids is used to record a probability that there is an obstacle in the second grid; and obtaining the distance map based on the occupied map.

In an embodiment, when the probability that there is an obstacle in the second grid is greater than or equal to a particular threshold, it may be considered that there is an obstacle in the second grid; or when the probability that there is an obstacle in the second grid is less than a particular threshold, it may be considered that there is no obstacle in the second grid.

In an embodiment, each of the plurality of second grids may be further directly used to record whether there is an obstacle in the second grid. For example, when a value recorded in the second grid is 1, it indicates that there is an obstacle; or when the value recorded in the second grid is 0, it indicates that there is no obstacle.

It should be understood that the occupied map is provided by an upstream module, for example, the foregoing obstacle decision maker 320. The occupied map includes obstacle information in a given zone near an ego vehicle. It should be further understood that the obstacle information is information about an obstacle or a predicted track of the obstacle, and a grid occupied by the obstacle is a grid occupied by the obstacle or by a predicted track projection of the obstacle.

It should be understood that, after the occupied map is obtained, the occupied map needs to be converted into a distance map. A conversion manner is described in detail in the following specific implementation, and details are not described herein.

In a specific zone range in front of the vehicle, the traveling apparatus cannot avoid an obstacle in the zone regardless of which obstacle avoidance path is selected by the traveling apparatus. In addition, obstacle avoidance path planning is performed based on occupied-map information provided by the upstream module, and obstacle information provided by the upstream module not only includes an actual pose of a dynamic or static obstacle and a predicted track projection of the obstacle, but also may include an obstacle occupation situation caused by false detection on a head part of the ego vehicle, or a situation in which ground unevenness causes the occupied map to have obstacle information in this zone. Therefore, in this case, if the obstacle in this zone is still considered, path planning is affected. Consequently, the obstacle in this zone always needs to be avoided in a traveling process, causing sharp oscillation of the path.

Therefore, in this embodiment of this application, the second grid located in the first zone in the occupied map may be filtered out.

The first zone is located in front of the traveling apparatus. If there is an obstacle in the first zone, the traveling apparatus cannot avoid the obstacle in the first zone; and then obtain the distance map based on the occupied map obtained after the filtering-out is performed. In this way, the traveling apparatus is effectively prevented from performing unreasonable avoidance due to false detection of an obstacle. This ensures that remaining occupied grids include only necessary information required by an obstacle avoidance algorithm, thereby ensuring stability of the obstacle avoidance path. A manner of filtering out a grid is described in detail in the following specific implementation, and details are not described herein.

Operation S420: Determine a first horizontal background cost potential field in a near-field range based on the distance map.

The near-field range is a range in which a longitudinal distance from the traveling apparatus is less than or equal to a first threshold, the first horizontal background cost potential field is a first repulsion field formed by an obstacle at a horizontal location on the traveling apparatus, the first horizontal background cost potential field includes a target minimum-value point, background costs on two horizontal sides of the target minimum-value point feature monotonicity, and the background cost represents a near-field horizontal collision cost caused by the obstacle at the horizontal location in the near-field range to the traveling apparatus.

In an embodiment, the foregoing traveling apparatus may be an autonomous vehicle, a robot, or another autonomous traveling apparatus. This is not limited in this application. For ease of description, in this application, an ego vehicle is used to represent the traveling apparatus.

It should be understood that the near-field range may be a range obtained by extending 5 m longitudinally along a path direction from an origin of a Frenet coordinate system. In this embodiment of this application, the origin may be the center of a rear axle of the ego vehicle. It should be further understood that, a length of the ego vehicle usually may be 3 m to 6 m, and therefore, the obstacle at the horizontal location in the near-field range may be understood as an obstacle on each of two horizontal sides of the ego vehicle. The near-field range may be determined based on the length and a traveling speed of the ego vehicle and scenario complexity. This is not limited in this application.

It should be understood that the first horizontal background cost potential field is the first repulsion field formed by the obstacle at the horizontal location on the ego vehicle. A repulsion field is formed by an obstacle at a horizontal location on the traveling apparatus, can indicate a trend of collision by the obstacle with the traveling apparatus, can guide the traveling apparatus to avoid the obstacle, and may also be referred to as a collision field or a risk field. It should be understood that the first repulsion field can indicate a trend of collision by the obstacle with the traveling apparatus after monotonicity processing is performed.

To be specific, the first horizontal background cost potential field can indicate a trend of collision between the ego vehicle at the horizontal location and the obstacle. Usually, a higher background cost indicates a smaller distance between the ego vehicle and the obstacle, and a higher possibility of collision; and a lower background cost indicates a larger distance between the ego vehicle and the obstacle, and a safe distance can be kept from the obstacle during traveling at the horizontal location corresponding to the background cost.

It should be understood that the background costs on the two horizontal sides of the target minimum-value point feature monotonicity. Specifically, a potential field on a left side of the target minimum-value point is monotonically decreasing, and a potential field on a right side of the target minimum-value point is monotonically increasing. This means that the background costs on the two sides of the target minimum-value point each are greater than a background cost at the target minimum-value point. In other words, a potential field at a horizontal location of the target minimum-value point is the lowest, and the ego vehicle can travel stably along a path on which the horizontal location is located.

In an embodiment, the first horizontal background cost potential field may be of a "V" shape, a "/" shape, or a "\" shape. It should be further understood that, a slope of a monotone function may be a fixed value, or may be a value that continuously changes with a horizontal location. This is not limited in this application. For ease of description, in the following specific embodiments, a V-shaped first horizontal background cost potential field is used.

Operation S430: Determine a current obstacle avoidance path based on the first horizontal background cost potential field.

In an embodiment, the determining a current obstacle avoidance path based on the first horizontal background cost potential field may be determining the current obstacle avoidance path based on the horizontal location of the target minimum-value point in the first horizontal background cost potential field. In other words, the current obstacle avoidance path is determined based on a horizontal location with a lowest potential field, so that the ego vehicle can travel stably along the location with the lowest potential field.

In this embodiment of this application, the first horizontal background cost potential field in the near-field range is considered when the current obstacle avoidance path is planned. In one aspect, when the obstacle avoidance path is planned, only the obstacle information in the near-field range is considered, to avoid the following case: When an existing method for planning an obstacle avoidance path is used, if a distant obstacle changes, a path near the ego vehicle changes, making traveling unstable. In another aspect, the first horizontal background cost potential field in the near-field range is constructed, to effectively reflect a trend of horizontal collision between the ego vehicle and the obstacle. The obstacle avoidance path planned on this basis can enable the ego vehicle to keep an optimal horizontal distance from the obstacle in a complex and narrow environment, thereby improving stability of the obstacle avoidance path.

In an embodiment, a second horizontal background cost potential field in the near-field range may be first determined based on the distance map. The second horizontal background cost potential field is a second repulsion field formed by the obstacle at the horizontal location on the traveling apparatus, and the second horizontal background cost potential field includes at least one minimum-value point. The target minimum-value point is determined from the at least one minimum-value point. Monotonicity processing is performed on the background costs on the two horizontal sides of the target minimum-value point, to generate the first horizontal background cost potential field, where a slope of the monotonicity processing is greater than or equal to a second threshold. For example, a value of the slope may be any value greater than or equal to 10/1 m, and a specific value needs to be determined with reference to an actual situation. This is not limited herein.

It should be understood that the second repulsion field can indicate a trend of collision by the obstacle with the traveling apparatus before monotonicity processing is performed. In other words, the first repulsion field is obtained after monotonicity processing is performed on the second repulsion field.

In this embodiment of this application, a manner of constructing the first horizontal background cost potential field may be as follows: The second horizontal background cost potential field in the near-field range is first constructed based on the distance map, then one target minimum-value point is determined from the at least one minimum-value point in the second horizontal background cost potential field, and monotonicity processing is performed on the background costs on the two horizontal sides of the target minimum-value point, to generate the first horizontal background cost potential field. In addition, the slope for the monotonicity processing is set to be greater than or equal to the second threshold, so that a background cost potential field at the horizontal location of the target minimum-value point is obviously lower than a background cost potential field at another horizontal location, and it can be ensured that the ego vehicle travels stably on a path with the lowest potential field. In other words, this means that when an obstacle on a side of the ego vehicle slightly approaches in a horizontal direction, a background cost potential field at a horizontal location of the ego vehicle significantly increases, so that the ego vehicle avoids the obstacle slowly and stably and moves to the horizontal location with the lowest background cost potential field, and keeps a safe distance from the obstacle.

In an embodiment, there is no obstacle between the target minimum-value point and the traveling apparatus.

In other words, in the near-field range, there is no obstacle between the horizontal location represented by the target minimum-value point and the horizontal location of the traveling apparatus.

In an embodiment, the target minimum-value point may be a smallest minimum-value point in all minimum-value points between which and the traveling apparatus there is no obstacle in the near-field range.

It should be understood that, in an actual scenario, there may be no obstacle between horizontal locations of a plurality of minimum-value points and the horizontal location of the ego vehicle. In this case, the smallest minimum-value point in these minimum-value points may be used as the target minimum-value point; or one of these minimum-value points may be selected as the target minimum-value point based on an actual situation. For example, a background cost of the smallest minimum-value point is close to that of the second smallest minimum-value point, and a horizontal location of the second smallest minimum-value point is closer to the ego vehicle. In this case, the second smallest minimum-value point may be used as the target minimum-value point. For ease of description, in embodiments described below, the smallest minimum-value point in all the minimum-value points between which and the horizontal location of the traveling apparatus there is no obstacle in the near-field range is used as the target minimum-value point.

In this embodiment of this application, there is no obstacle between the target minimum-value point and the traveling apparatus in the near-field range, so that the ego vehicle can stably move to the horizontal location of the target minimum-value point, to avoid a failure of the ego vehicle in moving to the horizontal location of the target minimum-value point that is caused by an obstacle between the horizontal location of the traveling apparatus and the horizontal location of the target minimum-value point, thereby improving stability of the path. In addition, when the target minimum-value point may be the smallest minimum-value point in all minimum-value points between which and the horizontal location of the traveling apparatus there is no obstacle in the near-field range, an optimal safe distance can be kept from the obstacle in an operation process of the ego vehicle.

In an embodiment, before the second horizontal background cost potential field in the near-field range is determined based on the distance map, the method 400 may further include: generating a feature vector, where the feature vector includes a path start point and a sampling goal point; and generating a plurality of candidate paths based on a reference path, a historical path, and the feature vector.

It should be understood that, during path planning in this embodiment of this application, a plurality of candidate paths may be first generated based on a location of the ego vehicle, and then an optimal candidate path is selected as the current obstacle avoidance path by evaluating the plurality of candidate paths. A manner of generating the candidate paths is described in detail in the following embodiments, and details are not described herein.

In an embodiment, the reference path may be horizontally shifted based on the sampling goal point, to generate a plurality of virtual parallel paths; a distance from each road point on each of the plurality of virtual parallel paths in the near-field range to a closest obstacle is calculated based on the distance map; a background cost of each virtual parallel path is calculated based on a minimum value of the distance on the virtual parallel path; and the second horizontal background cost potential field in the near-field range is generated based on the background costs of the plurality of virtual parallel paths in the near-field range. It should be understood that, a manner of constructing the first horizontal background cost potential field and the second horizontal background cost potential field is described in detail in the following specific implementation, and details are not described herein.

In an embodiment, in this embodiment of this application, when a candidate path is evaluated, evaluation is performed not only based on a background cost, but also based on one or more of a collision cost, a constraint cost, a switching cost, a horizontal shift cost, or a smoothness cost, so that the determined obstacle avoidance path can cover more factors, thereby further improving stability and safety of the obstacle avoidance path.

Therefore, in this embodiment of this application, before the current obstacle avoidance path is determined based on the first horizontal background cost potential field, one or more of a collision cost, a constraint cost, a switching cost, a horizontal shift cost, or a smoothness cost on each of the plurality of candidate paths may be further calculated based on the distance map.

The collision cost is used to evaluate whether the traveling apparatus collides when traveling on the candidate path, the constraint cost is used to evaluate whether each road point on the candidate path is in an obstacle avoidable range, the switching cost is used to evaluate a deviation between the candidate path and the historical path, the horizontal shift cost is used to evaluate a degree of a horizontal shift of the candidate path from a road centerline, and the smoothness cost is used to evaluate smoothness of the candidate path.

When the candidate path is evaluated, a final cost on each candidate path may be calculated based on a background cost in the first horizontal background cost potential field, or based on a background cost in the first horizontal background cost potential field and one or more of the collision cost, the constraint cost, the switching cost, the horizontal shift cost, or the smoothness cost; and then the current obstacle avoidance path is determined based on the final cost.

It should be understood that, in this embodiment of this application, the final cost may be calculated based on a weighted sum of the costs. It should be understood that, to enable the ego vehicle to keep a safe distance from the obstacle, weights of the background cost and the collision cost may be set to be relatively large. It should be understood that, acquisition of the foregoing costs and specific evaluation manners are described in detail in the following specific implementation, and details are not described herein.

In an embodiment, the method 400 further includes: determining a final obstacle avoidance path based on an arbitration result between the historical path and the current obstacle avoidance path.

It should be understood that the historical path is a path on which the ego vehicle travels in a previous frame, and the current obstacle avoidance path is a currently planned path. The final obstacle avoidance path is determined based on the arbitration result between the historical path and the current obstacle avoidance path. In other words, one path is selected from the historical path and the current obstacle avoidance path as the finally output obstacle avoidance path.

In this embodiment of this application, when the current obstacle avoidance path is determined, the final obstacle avoidance path is determined based on a difference between the current obstacle avoidance path and the historical path. This avoids a case in which an obstacle avoidance path obtained based on only a cost function or pure logic during operation in a complex and narrow environment generates interframe hopping, and effectively alleviates dependence of the planning method on the cost function, thereby ensuring stability of the path.

In an embodiment, if the current obstacle avoidance path is obviously superior to the historical path, the current obstacle avoidance path is switched to; or if the current obstacle avoidance path is not obviously superior to the historical path, the historical path is still used. This avoids a case in which an obstacle avoidance path obtained based on only a cost function or pure logic during operation in a complex and narrow environment generates interframe hopping, thereby ensuring stability of the path. A specific arbitration condition is described in detail in the following specific implementation, and details are not described herein.

In an embodiment, the method 400 may further include: performing time-domain smoothing based on the historical path and the final obstacle avoidance path. In this embodiment of this application, when the final obstacle avoidance path is obtained, time-domain smoothing may be further performed based on the historical path and the final obstacle avoidance path. In this case, if the final obstacle avoidance path is still the historical path, the obstacle avoidance path obtained after the time-domain smoothing is still the historical path; or if the final obstacle avoidance path is the current obstacle avoidance path, time-domain smoothing is performed based on the current obstacle avoidance path and the historical path. This effectively avoids a case in which interframe hopping is generated during obstacle avoidance path switching in a complex and narrow environment, thereby ensuring stability of the path.

In an embodiment, the method 400 may further include: outputting the final obstacle avoidance path to a speed planner, where the speed planner is configured to perform speed planning based on the final obstacle avoidance path and obstacle information on the final obstacle avoidance path. In this embodiment of this application, after the final obstacle avoidance path is output, the speed planner performs speed planning based on the obstacle information on the final obstacle avoidance path, and performs deceleration planning if an obstacle that may cause collision is discovered on the path, thereby improving safety of the path.

The following describes in detail a method for planning an obstacle avoidance path according to an embodiment of this application with reference to the accompanying drawings.

Figure 5:
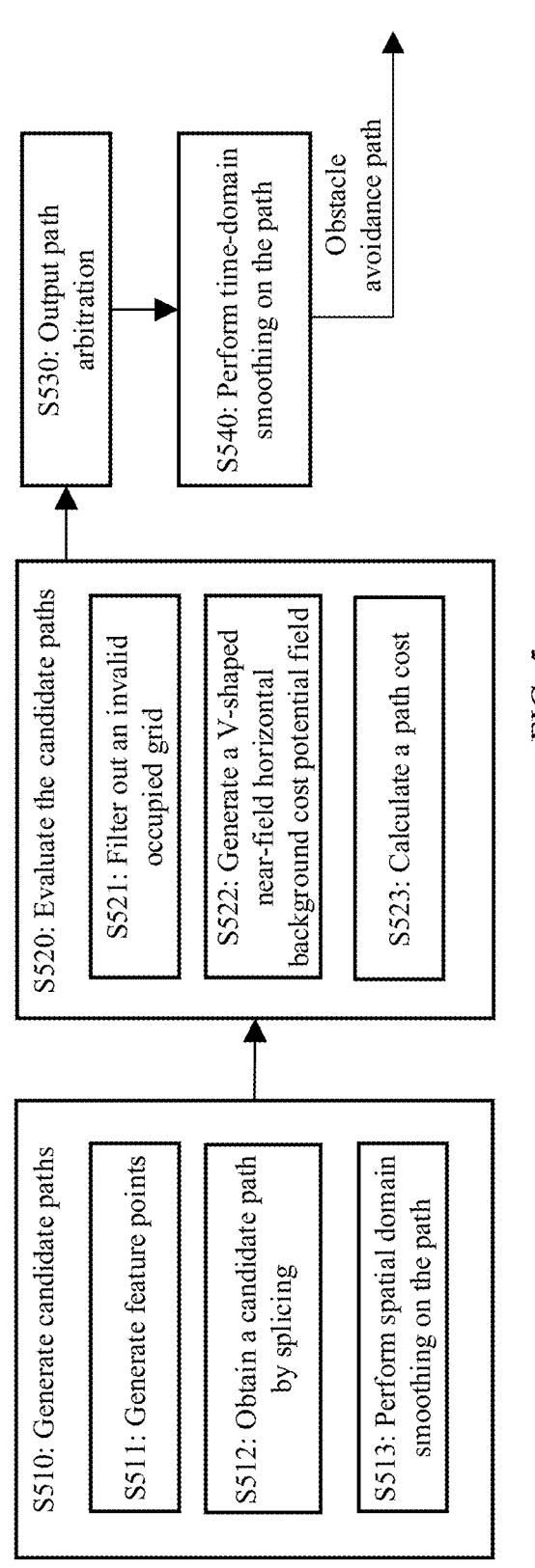
FIG. 5 is an example diagram of a core process of a method for planning an obstacle avoidance path according to an embodiment of this application.

In a preferred manner, FIG. 5 is an example diagram of a core process of a method for planning an obstacle avoidance path according to an embodiment of this application. It should be understood that the planning method shown in FIG. 5 may be applied to the complex and narrow scenario shown in FIG. 2. As shown in FIG. 5, the core process 500 includes operations S510, S520, S530, and S540. The following describes these operations in detail.

Operation S510: Generate candidate paths.

Figure 6:
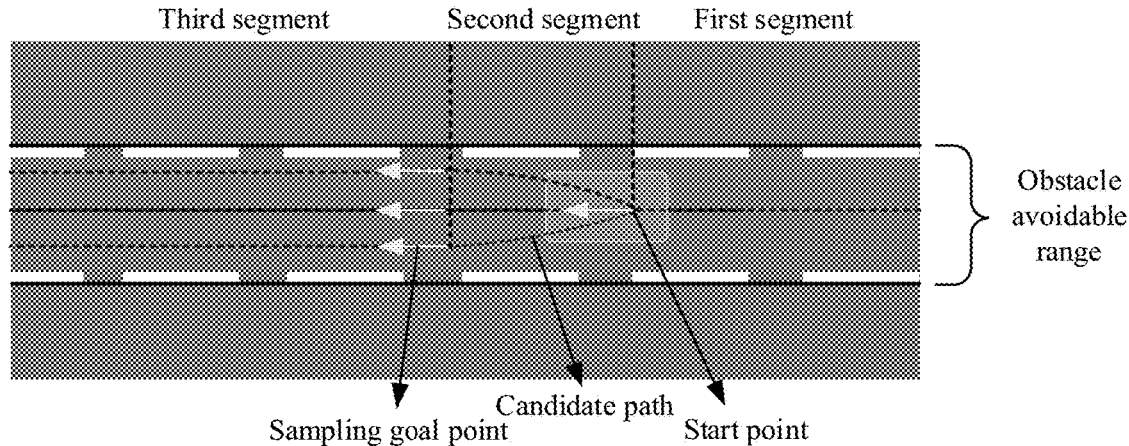
FIG. 6 is an example diagram of a candidate path generation scenario according to an embodiment of this application.

Generation of the candidate paths includes operations S511, S512, and S513. FIG. 6 is an example diagram of a candidate path generation scenario according to an embodiment of this application. The following describes these operations in detail with reference to FIG. 6.

Operation S511: Generate a feature vector.

Specifically, a feature vector including a path start point (start point) and a sampling goal point (goal point, sampling point for short) is generated based on a historical path, and a reference path and an obstacle avoidable range that are input by a reference path planner, as shown by arrows in FIG. 6.

It should be understood that the start point may be found in the historical path. In this embodiment of this application, a path through which the center of a rear axle of an ego vehicle passes in a previous frame is used as the historical path. Therefore, a road point closest to the center point of the rear axle of the ego vehicle may be found in the historical path. In this case, an actual location and orientation of the point may constitute a start point feature vector. It should be understood that, each path includes a large quantity of road points, and a distance between the road points may be determined based on an actual situation. For example, one road point may be set every other 0.1 m, or one road point may be set every other $0.1*v_{ego\ vehicle}$, where $v_{ego\ vehicle}$ is a traveling speed of the ego vehicle.

The goal point is in the obstacle avoidable range in front of a vehicle body, and is obtained through sampling by using the reference path as reference. It should be further understood that, one candidate path may include a plurality of goal points, but only one start point. Both the start point and the goal point are represented in a vector manner.

Operation S512: Obtain a candidate path by splicing.

Specifically, a multi-segment candidate path is generated by connecting the reference path, the historical path, and the feature vector, as shown in FIG. 6. A first segment is obtained by intercepting the historical path behind the start point. A second segment is obtained by connecting the start point and the goal point by using a smooth curve, so that the curve meets a vector constraint to generate a path. A third segment is obtained by translating the reference path to be behind the goal points corresponding to the second segment. The three segments of the path are connected in sequence, and the entire candidate path is obtained in a splicing manner.

Operation S513: Perform spatial-domain smoothing on the path.

Spatial smoothing is performed on each candidate path, to enable the segments of the path to be smoothly connected. In an embodiment, a smooth control point may be generated every other several road points in a geodetic cartesian coordinate system, and a smooth candidate path is generated based on a control point set and a three-order B spline. In an embodiment, one smooth control point may be generated based on three road points, or may be generated based on four, five, six road points, or the like. This is not limited in this application.

Figure 7:
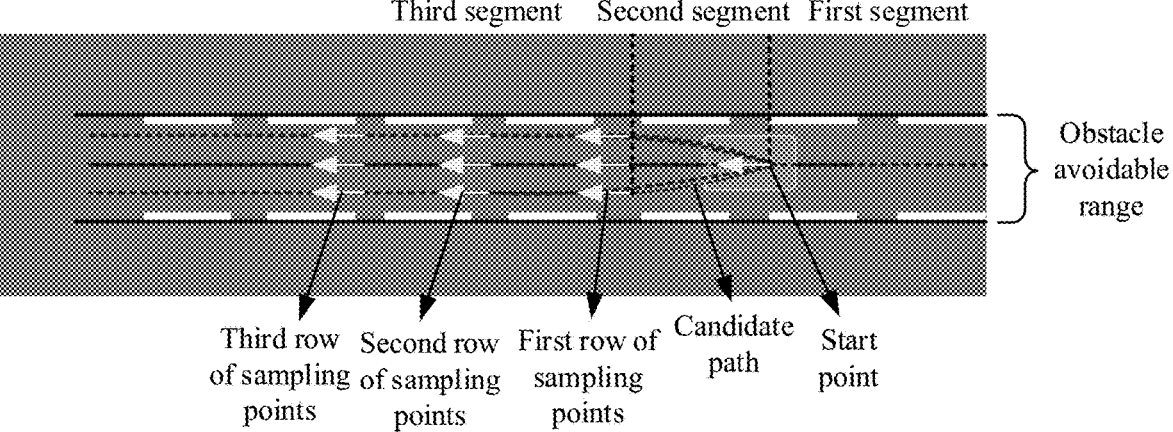
FIG. 7 is an example diagram of another candidate path generation scenario according to an embodiment of this application.

For example, in the scenario shown in FIG. 2, a plurality of candidate paths may be generated in a manner shown in FIG. 7. Specifically, it is assumed that the reference path is a centerline of a current lane, a lane width, that is, the obstacle avoidable range, is 3.5 m, and widths of left and right sides of the lane centerline are both 1.75 m. In this case, a road point closest to the center point of the rear axle of the ego vehicle can be found in the historical path, and the actual location and orientation of the point constitute the start point feature vector. Then, three rows of goal points are generated, and s coordinates of the rows of goal points are respectively 1.2*max (vehicle speed, 4.17 m/s), 2.0*max (vehicle speed, 4.17 m/s), and 3.5*max (vehicle speed, 4.17 m/s). There are a total of 11 goal points in each row, and goal points with a same orientation as the reference path are distributed equidistantly in an obstacle avoidable range of a corresponding longitudinal location. max(vehicle speed, 4.17 m/s) refers to using a larger value in the current vehicle speed and 4.17 m/s; and 1.2*max(vehicle speed, 4.17 m/s) refers to multiplying 1.2 by the larger value in the current vehicle speed and 4.17 m/s, to obtain the s coordinates of the first row of goal points. It should be understood that the foregoing data is merely used as an example, and cannot be construed as a limitation on this application.

After the feature vector is determined, the three-segment candidate path is generated by connecting the reference path, the historical path, and the feature vector. The three-segment candidate path includes a historical segment, a polynomial segment, and an extension segment. The historical segment is obtained by intercepting the historical path behind the start point. In the polynomial segment, a path is generated by using vector constraints of the start point and the plurality of rows of goal points. In a specific method, a cubic polynomial equation in a Frenet system is calculated by using a vector constraint of any goal point in combination with a vector constraint of the start point, and then is discretized into road points, to obtain the second segment of the path. The extension segment is obtained by translating the reference path to be behind the goal points corresponding to the second segment. The three segments of the path are connected in sequence, and the entire candidate path is obtained in a splicing manner. Paths are in a one-to-one correspondence with the goal points. In this example, a total of 33 candidate paths are generated.

Finally, spatial smoothing is performed on each candidate path. In specific practice, a smooth control point is generated every other four road points in the geodetic cartesian coordinate system, and a smooth candidate path is generated based on the control point set and the three-order B spline.

After the candidate paths are generated, the candidate paths need to be evaluated. To be specific, a suitable candidate path is selected from these candidate paths as a current obstacle avoidance path. The following describes in detail a process of evaluating the candidate paths.

Operation S520: Evaluate the candidate paths.

In this embodiment, evaluation of the candidate paths mainly includes operations S521, S522, and S523. The following describes these operations in detail with reference to the accompanying drawings.

Operation S521: Filter output an invalid occupied grid.

Based on the foregoing generated cluster of candidate paths and a pose of the ego vehicle, it can be easily learned that, in a specific zone range in front of the vehicle, an obstacle in the zone cannot be avoided regardless of which candidate path is selected by the ego vehicle. In addition, obstacle avoidance path planning is performed based on occupied-map information provided by an upstream module, and obstacle information provided by the upstream module not only includes an actual pose of a dynamic or static obstacle and a predicted track projection of the obstacle, but also may include an obstacle occupation situation caused by false detection on a head part of the ego vehicle, or a situation in which ground unevenness causes the occupied map to have obstacle information in this zone. In this case, if the obstacle in this zone is still considered, path planning is affected. Consequently, the obstacle related to the false detection always needs to be avoided in a traveling process, causing a significant change to path planning, and leading to oscillation of the path.

Figure 8:
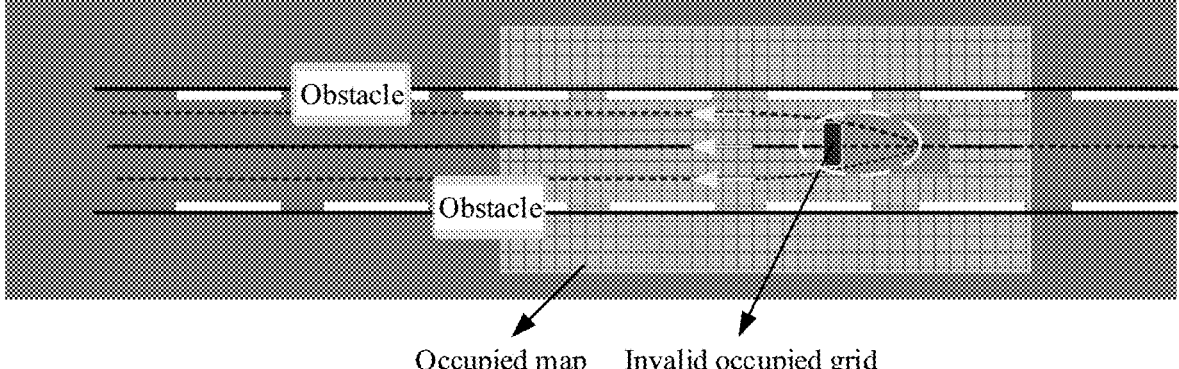
FIG. 8 is an example diagram of invalid occupied grids according to an embodiment of this application.

Therefore, before a near-field horizontal collision potential field is constructed in obstacle avoidance path planning, the obstacle in this zone may not be considered, and grids in this zone may be filtered out in the occupied map as invalid grids. FIG. 8 is an example diagram of invalid occupied grids according to an embodiment of this application. The following describes in detail a method for filtering out invalid occupied grids with reference to the accompanying drawings.

Figure 9:
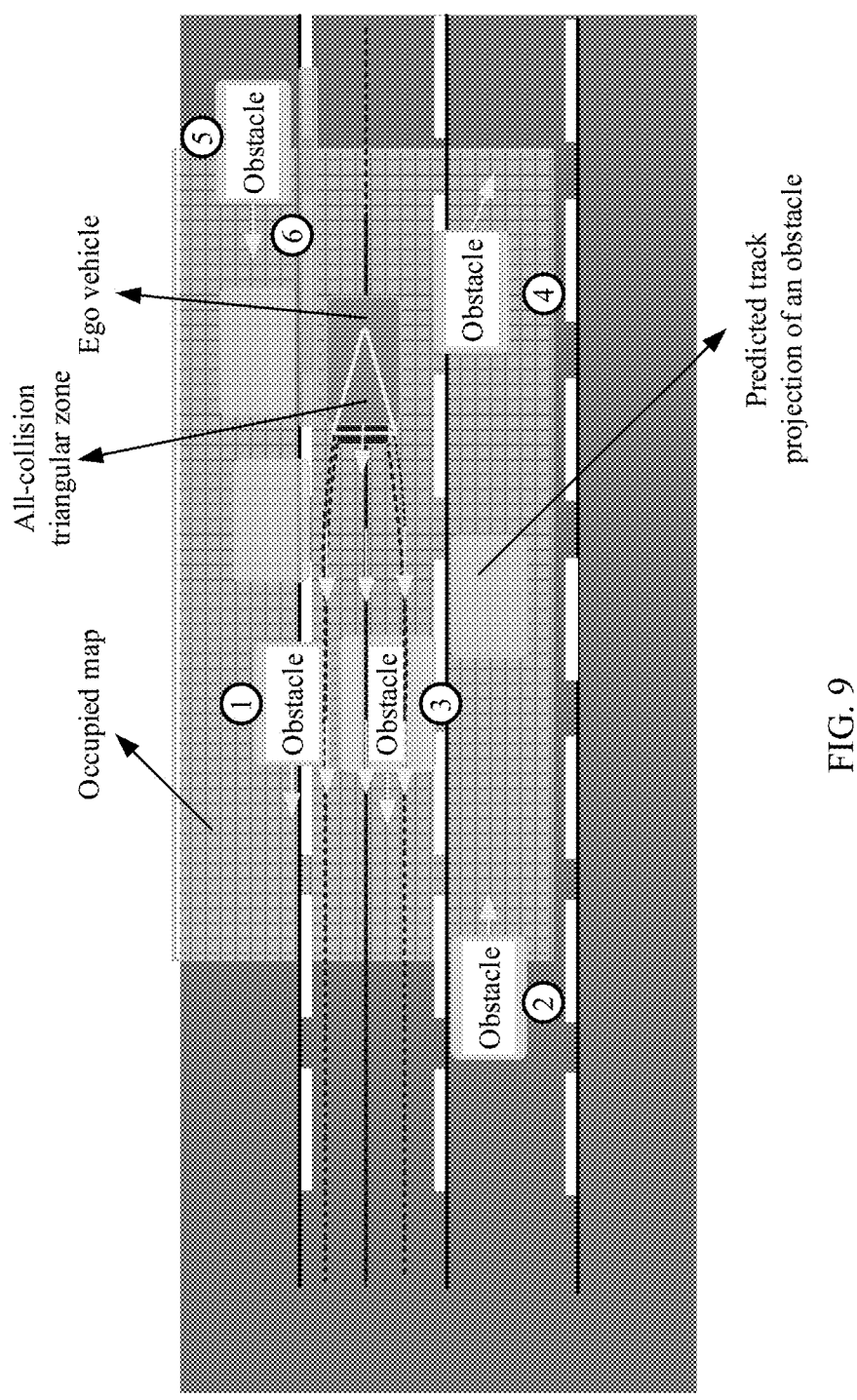
FIG. 9 is an example diagram of an all-collision triangular zone according to an embodiment of this application.

In an embodiment, an all-collision triangular zone may be constructed to filter out the invalid occupied grids. FIG. 9 is an example diagram of an all-collision triangular zone according to an embodiment of this application. In an embodiment, a coverage of the occupied map may be 50 m in front of the vehicle body, 10 m behind the vehicle body, and 20 m on the left and right of the vehicle body, a resolution (namely, an area occupied by each grid) is 0.2 m*0.2 m, a value of an occupied grid in the occupied map is 1, and a value of an unoccupied grid is 0. It should be understood that the all-collision triangular zone means that in a particular triangular zone, the ego vehicle cannot avoid an obstacle in this zone regardless of which path is selected by the ego vehicle. A vertex of the triangular zone is a location of the start point of the candidate paths, a bottom edge of the triangular zone is equal to a width of the ego vehicle, and two vertexes on the bottom edge of the triangular zone are located on outermost candidate paths. Occupied grids in the all-collision triangular zone are directly filtered out.

Figure 10:
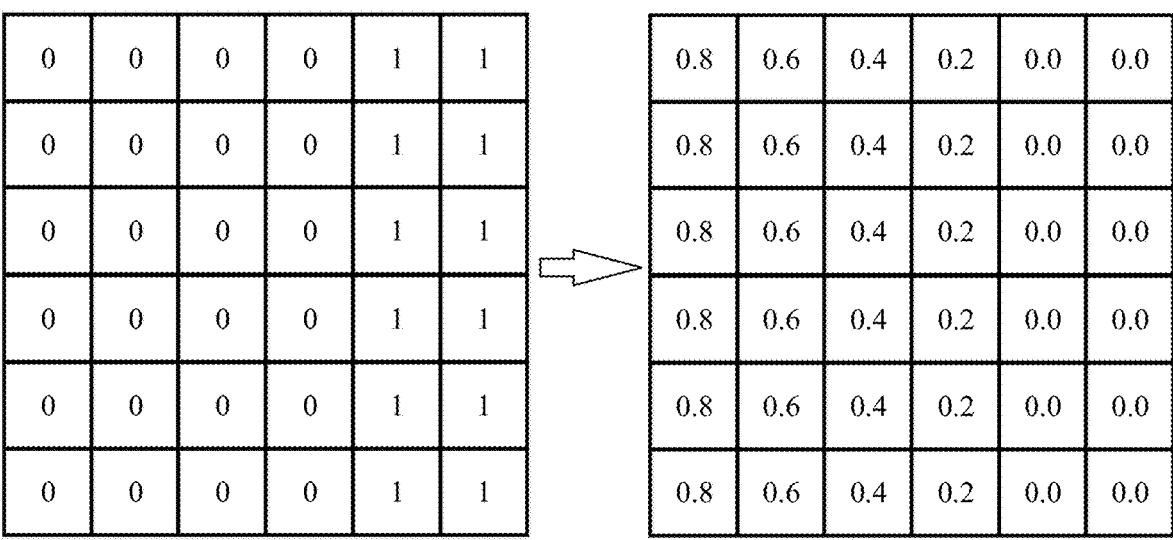
FIG. 10 is an example diagram of conversion from an occupied map to a distance map according to an embodiment of this application.

In an embodiment, after the occupied map obtained after the invalid occupied grids are filtered out is obtained, the occupied map may be converted into a distance map. FIG. 10 is an example diagram of conversion from an occupied map to a distance map according to an embodiment of this application. In an embodiment, the occupied map may be converted into the distance map by using a distance transformation DistanceTransform function of OpenCV. As shown in FIG. 10, in the occupied map, a part whose grid value is 1 indicates that the grid is occupied, that is, an obstacle exists; and a part whose grid value is 0 indicates that the grid is not occupied, that is, no obstacle exists. A size of a grid in the distance map into which the occupied map is converted is equal to a size of a grid in the occupied map, and a value of each grid in the distance map is a distance from the grid to a closest occupied grid point. It can be seen that, in the distance map, a part whose grid value is 0 indicates that a distance from the grid to an obstacle is 0, that is, the grid is occupied; and a part whose grid value is 0.2 in the distance map indicates that a distance from the grid to a closest obstacle is 0.2 m. It should be understood that, "a value of each grid in the distance map is a distance from the grid to a closest occupied grid point" means that if there are usually a plurality of obstacles around a grid, only a distance from the grid to a closest obstacle is recorded in the grid. In an embodiment, the distance may be a straight line distance.

In this embodiment of this application, the invalid grids in front of the vehicle are filtered out, so that the ego vehicle is effectively prevented from performing unreasonable avoidance due to false detection of an obstacle. This ensures that remaining occupied grids include only necessary information required by an obstacle avoidance algorithm, thereby ensuring stability of the obstacle avoidance path.

It should be further understood that, filtering out the invalid grids in obstacle avoidance path planning means that an obstacle in this zone is not considered in obstacle avoidance path planning. However, in an actual scenario, if there is a real obstacle in this zone, a speed planning module performs corresponding deceleration processing to avoid collision.

Operation S522: Generate a V-shaped near-field horizontal background cost potential field.

In this embodiment, the V-shaped near-field horizontal background cost potential field, namely, the foregoing first horizontal background cost potential field in the near-field range, may be constructed based on distance-map information obtained after the invalid grids are filtered out. A process of constructing the V-shaped near-field horizontal background cost potential field is described in detail below with reference to the accompanying drawings.

Figure 11:
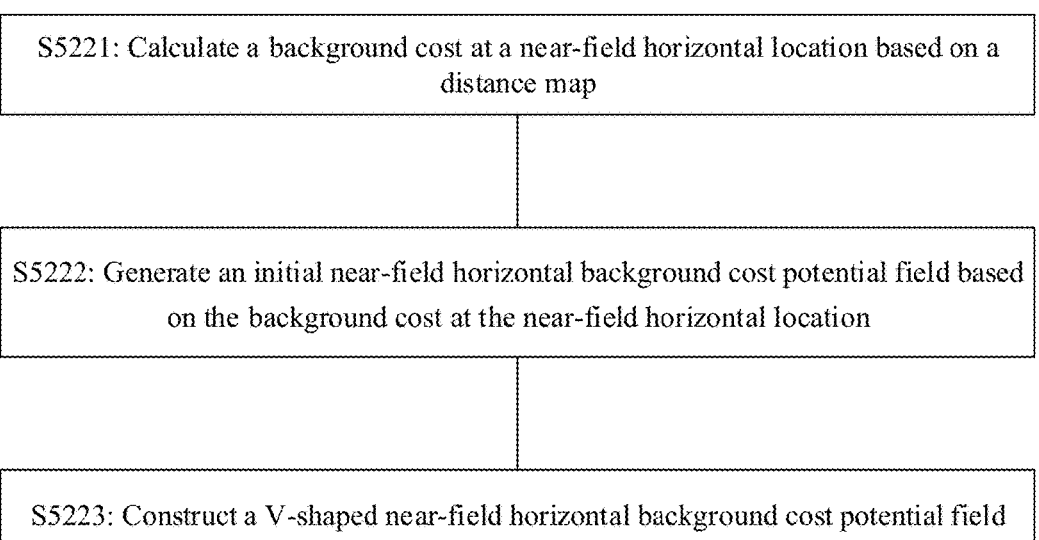
FIG. 11 is an example diagram of a method for generating a V-shaped near-field horizontal background cost potential field according to an embodiment of this application.

FIG. 11 is an example diagram of a method for generating a V-shaped near-field horizontal background cost potential field according to an embodiment of this application. The method is operation S522, including operations S5221, S5222, and S5223, which are described in detail below.

Operation S5221: Calculate a background cost at a near-field horizontal location based on the distance map.

Figure 12:
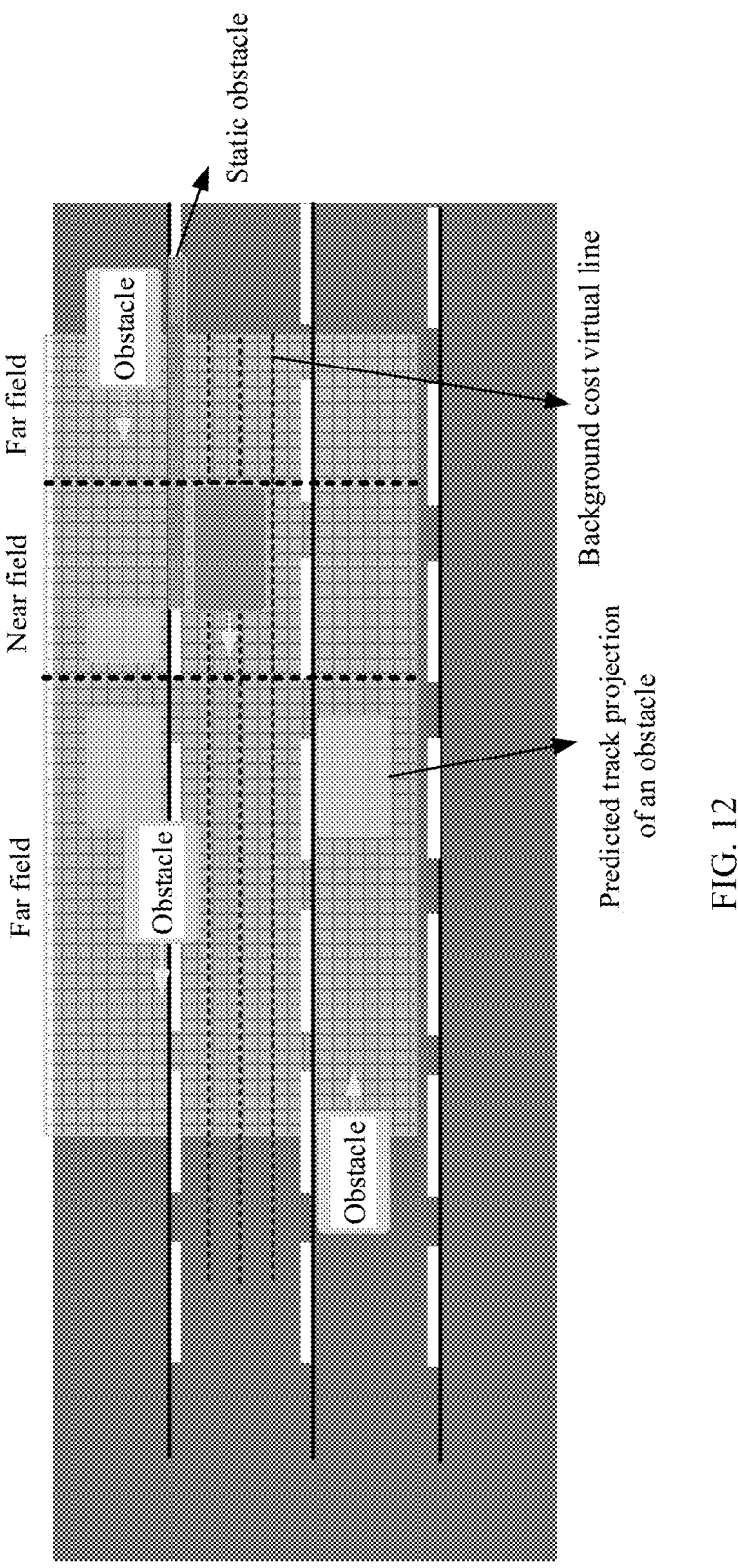
FIG. 12 is an example diagram of generating a virtual background line according to an embodiment of this application.

It should be understood that, before the background cost at the near-field horizontal location is calculated based on the distance map, the reference path first needs to be shifted horizontally based on the sampling goal points on the plurality of candidate paths generated in FIG. 6 or FIG. 7, to generate a plurality of virtual parallel paths. The generated virtual parallel paths are shown in FIG. 12. To be specific, the reference path is horizontally translated to horizontal locations of the sampling goal points. In this embodiment of this application, the virtual parallel paths may also be referred to as background cost virtual lines, and a collision trend of the ego vehicle on each background cost virtual line may be represented by using a background cost of the background cost virtual line. A higher background cost indicates a higher possibility of collision, and a lower background cost indicates a lower possibility of collision.

After the background cost virtual lines are generated, a background cost on each background cost virtual line is calculated.

Specifically, distances from all road points of each background cost virtual line in the near-field range to obstacles closest to the road points are calculated by using the distance-map information, and the background cost of the background cost virtual line is calculated by using a smallest value of the distances.

For example, a formula for calculating the background cost based on the smallest value of the distances may be as follows:

$$cost_{back} = \begin{cases} 1/(4^* d_{min.i}^4), & d_{min.i} \le \dfrac{\text{width}}{2} + 1.0 \\[2mm] 0.0, & d_{min.i} > \dfrac{\text{width}}{2} + 1.0 \end{cases} \quad (1)$$

$cost_{back}$ is the background cost; $d_{min.i}$ is the smallest value of the distances from all road points of a particular background cost virtual line in the near-field range to obstacles closest to the road points, and a road point having the smallest value of distances is denoted as a road point i; and width is the width of the vehicle. In the foregoing formula (1), a critical value is $$\frac{\text{width}}{2} + 1.0.$$

It should be further understood that the critical value in the foregoing formula (1) is only used as an example, and during actual application, the critical value may alternatively be any value in $$\frac{\text{width}}{2} + (0.3 \sim 1.2),$$

as long as it can be ensured that the ego vehicle is at a particular safe distance from the obstacle in the horizontal direction.

For example, a particular background cost virtual line has a total of four road points in the near-field range, and distances from the four road points to closest obstacles are 0.6, 0.5, 0.7, and 1.2, respectively. In this case, the smallest value 0.5 is used to calculate a background cost of the background cost virtual line. In addition, because $$0.5 \le \frac{\text{width}}{2} + 1.0,$$

the background cost of the background cost virtual line is $$1/(4 * d_{min.i}^4) = 4.$$

It should be further understood that the virtual parallel path includes a plurality of road points, and a distance between the road points may be determined based on an actual situation. For example, one road point may be set every other 0.1 m, or one road point may be set every other $0.1 * v_{ego\ vehicle}$, where $v_{ego\ vehicle}$ is a traveling speed of the ego vehicle. This is not limited in this application.

In an embodiment, to calculate a distance from a particular road point on each virtual parallel path in the near-field range to a closest obstacle, a distance value of a grid in which the road point is located may be directly used, or the distance may be calculated by using a bilinear interpolation method based on distance information in four grids around the road point. This is not limited in this application.

Operation S5222: Generate an initial near-field horizontal background cost potential field based on the background cost at the near-field horizontal location.

Specifically, the initial near-field horizontal background cost potential field, namely, the foregoing second horizontal background cost potential field in the near-field range, is generated based on background costs of the plurality of background cost virtual lines in the near-field range.

Operation S5223: Construct the V-shaped near-field horizontal background cost potential field based on the initial near-field horizontal background cost potential field.

Figure 13:
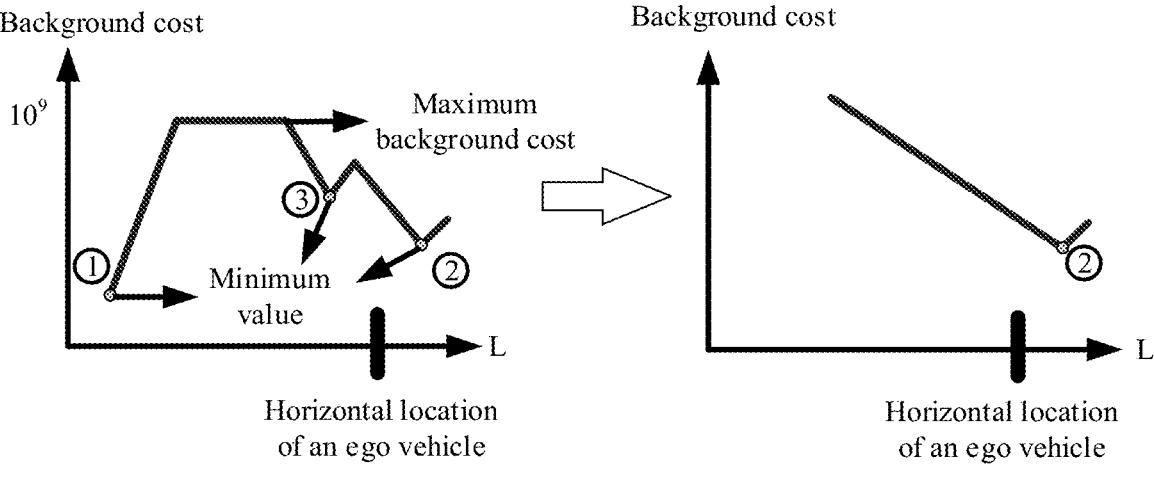
FIG. 13 is an example diagram of a monotonicity processing principle of a near-field horizontal background cost potential field according to an embodiment of this application.

Specifically, FIG. 13 is an example diagram of a monotonicity processing principle of a near-field horizontal background cost potential field according to an embodiment of this application.

It should be understood that, in an actual traffic scenario, the initial near-field horizontal background cost potential field formed by the background costs of the plurality of background cost virtual lines usually has a plurality of minimum values in a horizontal distribution (in an L direction). A plurality of minimum-value points in the initial near-field horizontal background cost potential field first need to be found, and horizontal locations and corresponding background cost values need to be recorded. For example, as shown in a left figure in FIG. 13, there are three minimum-value points in the horizontal distribution of the background costs. Then, a current horizontal location of the ego vehicle and locations of the three minimum values are separately found. For example, the current horizontal location of the ego vehicle is L=−0.5; a coordinate of a point 1 is: L=1.3 and $Cost_{back}=0.13$; a coordinate of a point 2 is: L=−1.2 and $Cost_{back}=0.53$; and a coordinate of a point 3 is: L=−0.2 and $Cost_{back}=1.7$. In addition, it can be further seen from FIG. 13 that, there is further a maximum background cost in the near-field range of the actual traffic scenario. It should be understood that, a distance from a particular road point on a background cost virtual line at a horizontal location corresponding to the maximum background cost in the near-field range to an obstacle is 0. To be specific, there is an obstacle on the road point. In this embodiment, when a distance from an obstacle is 0, a background cost cannot be calculated based on the formula (1). Therefore, a manner of customizing a maximum background cost may be used, for example, the maximum background cost is $10^9$.

It can be seen that, in the foregoing three minimum-value points, the background cost of the point 1 is the lowest. This means that an optimal horizontal distance can be kept from the obstacle if the ego vehicle travels on this background cost virtual line. If the path is selected based on a conventional optimization algorithm, the background cost virtual line on which the horizontal location of the point 1 is located is selected as an optimal path. However, in the actual traffic scenario, as shown in the left figure in FIG. 13, an obstacle exists between the point 1 and the ego vehicle. In addition, in the near-field range (0 m to 5 m), the length of the ego vehicle usually reaches 3 m to 6 m. Therefore, in the actual scenario, the ego vehicle cannot successfully travel to the path with the lowest background cost due to existence of an intermediate obstacle. In other words, the point with the lowest background cost in the near-field horizontal background cost potential field is not necessarily a most suitable point.

Therefore, based on the foregoing problem, in this embodiment of this application, a target minimum value further needs to be determined from the plurality of minimum values. The target minimum value is a smallest minimum-value point in all the minimum-value points between which and the horizontal location of the ego vehicle there is no obstacle in the near-field range.

Specifically, the minimum-value points are sorted in ascending order of background cost values. Starting from the smallest minimum value, whether there is an obstacle, to be specific, whether a point with a maximum background cost (a point whose distance from an obstacle is 0) exists between the point and the horizontal location of the ego vehicle is sequentially checked. If an obstacle exists, the corresponding minimum-value point is considered as an invalid point, and is discarded. If no obstacle exists, the point is used as reference, and background costs on two sides of the point are processed into a monotone function by using a fixed operation, to form the V-shaped near-field horizontal collision potential field. Briefly, the minimum values are first sorted in ascending order, and then a check is performed starting from a current smallest minimum value. If there is an obstacle between the current smallest minimum value and the ego vehicle, the point is discarded, and a next smallest minimum-value point is checked. If there is no obstacle between the current smallest minimum value and the ego vehicle, the point is used as reference, and the background costs on the two sides of the point are constructed into a monotone function by using a particular slope, and the previous background costs on the two sides do not need to be considered. In addition, the background cost of each background cost virtual line can be directly calculated at the corresponding horizontal location based on the slope.

For example, as shown in the left figure of FIG. 13, there is a maximum background cost between horizontal locations of the point 1 and the ego vehicle, and therefore this point is discarded; there is no maximum background cost between the point 2 and the ego vehicle, and therefore this point is a valid minimum-value point. Based on this point, monotonicity processing is performed on background costs on two sides of the point to obtain the V-shaped near-field horizontal collision potential field, and the slope of the monotone function is 10/1 m, as shown in a right figure of FIG. 13.

It should be understood that the slope of the function in monotonicity processing should be greater than or equal to a particular threshold. For example, the slope may be any value greater than or equal to 10/1 m. A specific value needs to be determined with reference to an actual situation, and is not limited herein. In this way, a background cost at an optimal horizontal location is far less than that of another path, and if the ego vehicle slightly deviates from the optimal horizontal location in an actual traveling process, a final cost obviously increases. Therefore, the ego vehicle can travel stably at the horizontal location with the lowest background cost, thereby improving traveling stability and safety of the ego vehicle.

Operation S523: Calculate path costs.

Preferably, in this embodiment, the evaluation of the candidate paths may be performed by using a background cost in combination with a collision cost, a constraint cost, a switching cost, a horizontal shift cost, and a smoothness cost. The following describes these costs one by one with reference to formulas and the accompanying drawings The collision cost is used to evaluate a possibility of collision with an obstacle when the ego vehicle travels on a candidate path. Specifically, a collision cost of each road point on each candidate path in all candidate paths is calculated, and then the collision costs of all road points on each candidate path are summed up to obtain a final cost of the candidate path. It should be understood that the collision cost of each road point is calculated based on a distance from the road point to an obstacle closest to the road point, and a shorter distance indicates a higher collision cost.

For example, a formula (2) is a collision cost calculation manner provided in this embodiment of this application:

$$cost_{obj} = \sum_i \begin{cases} \dfrac{e^{\frac{1}{max(d_{min.i}/0.7,0.2)}}}{pt_i.s^2}, & d_{min.i} \leq \dfrac{width}{2} + 0.7 \\ 0.0, & d_{min.i} > \dfrac{width}{2} + 0.7 \end{cases} \quad (2)$$

$cost_{obj}$ is the collision cost; $d_{min.i}$ is a distance from an $i^{th}$ road point on the candidate path to an obstacle; $max(d_{min}.i/0.7,0.2)$ indicates to use a larger value in $d_{min}.i/0.7$ and 0.2; $pt_i.s$ is a longitudinal coordinate of the $i^{th}$ road point on the candidate path; and width is the width of the vehicle.

In the foregoing formula (2), a critical value is $$\frac{width}{2} + 0.7.$$

When $d_{min.i}$ is greater than the critical value, it is considered that no collision occurs; or when $d_{min.i}$ is less than or equal to the critical value, it is considered that collision occurs. It should be further understood that the critical value in the foregoing formula is only used as an example, and during actual application, the critical value may alternatively be any value in $$\frac{width}{2} + (0.3\text{~}1.2),$$

as long as it can be ensured that the ego vehicle does not collide when traveling on this path.

The collision cost of each road point above is calculated based on the distance from the road point and the obstacle closest to the road point. Therefore, before the collision cost is calculated, the distance from each road point to the obstacle closest to the road point first needs to be calculated. A manner of calculating the distance from the road point to the closest obstacle is described in detail with reference to FIG. 14 and FIG. 15.

Figure 14:
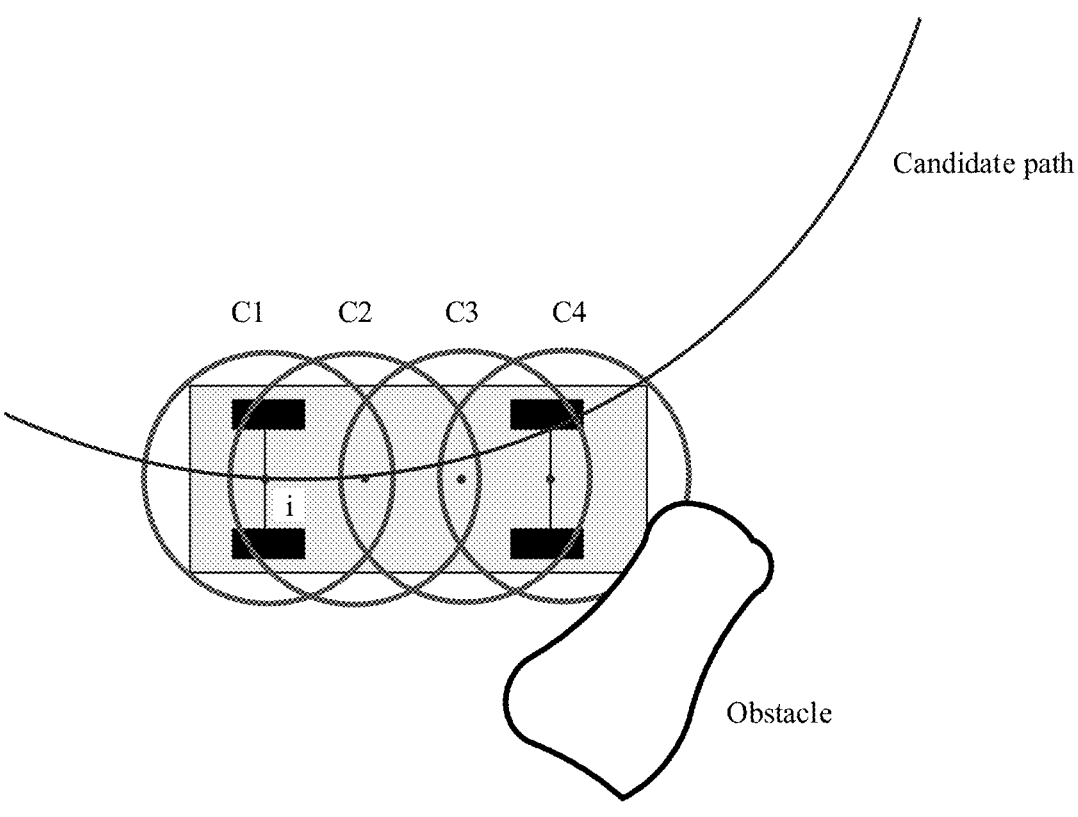
FIG. 14 is an example diagram of a multi-circle collision model of a vehicle body according to an embodiment of this application.

FIG. 14 is an example diagram of a multi-circle collision model of a vehicle body according to an embodiment of this application. In this embodiment, the vehicle body is equivalent to a multi-circle model, and a circle center at which a middle point of a rear axle of the multi-circle collision model of the vehicle body is located overlaps each road point on the candidate path (it should be understood that, a traveling path of the ego vehicle is a path through which the center of the rear axle of the ego vehicle passes), and an orientation of a vehicle head is consistent with that of the road point. In this case, the distance from the road point on the corresponding candidate path to the obstacle is a shortest distance in distances from a plurality of circle centers in the multi-circle model to the obstacle. When the distance from any circle center to the obstacle is less than a particular distance, a state of the road point is considered as collided, and a collision cost of this point is defined by the distance.

For example, a distance from a road point i in FIG. 14 to an obstacle is described in detail by using the road point i as an example. As shown in FIG. 14, a road point i on a candidate path overlaps the middle point of the rear axle of the four-circle model (C1 to C4). In this case, the distance $d_{min.i}$ from the road point i to the obstacle is a shortest distance in distances from the four circle centers in the four-circle model to the obstacle, namely, a distance from a circle center of the circle C4 to the obstacle. If the distance is less than a particular threshold, it is considered that a state of the road point i is that collision occurs; or if the distance is greater than a particular threshold, it is considered that the state of the road point i is that no collision occurs.

Further, based on the foregoing method, all road points on a particular candidate path are traversed. If a state of any road point is collided, a state of the entire path is collided. In this embodiment of this application, a smallest value in longitudinal distances of all road points in a collided state on each candidate path is denoted as a collision distance of the candidate path. Based on the foregoing description, it can be learned that the collision distance and the distance $d_{min.i}$ from the road point to the obstacle are different.

Figure 15:
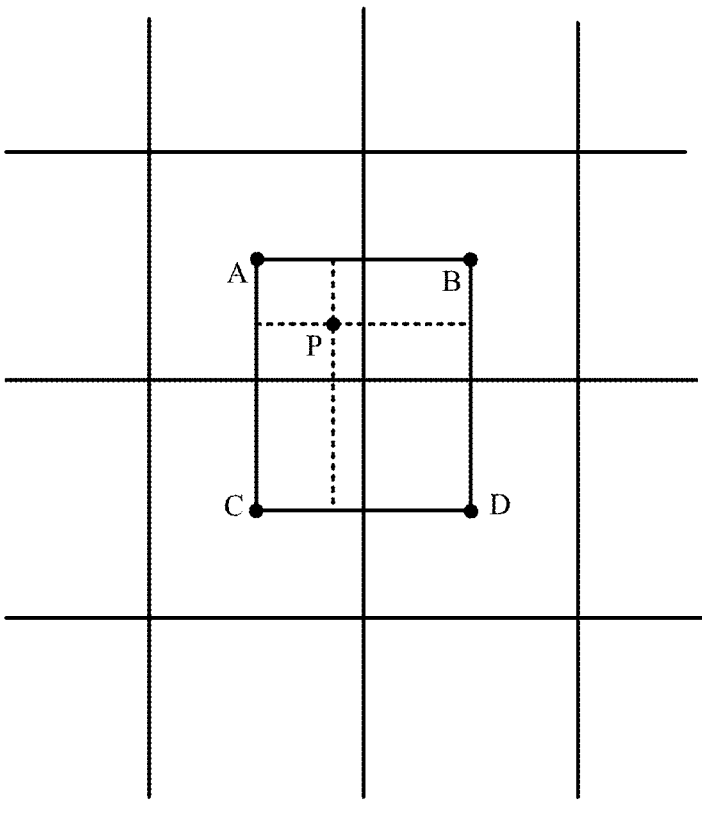
FIG. 15 is a diagram of a principle for calculating a precise obstacle distance according to an embodiment of this application.

In an embodiment, in this embodiment of this application, the distances from the plurality of circle centers in the multi-circle model to the closest obstacle may be calculated by using the distance map. In addition, during distance calculation, to avoid precision loss caused by a grid map, a bilinear interpolation method may be used to calculate a precise distance between a specific location of the circle center and the closest obstacle, as shown in FIG. 15. It should be understood that, a point P may be the center of a circle in the multi-circle model, and points A, B, C, and D respectively correspond to road points at centers of four grids in the distance map, and values in the four grids represent distances from A, B, C, and D to the closest obstacle. Therefore, a distance value of the point P can be calculated by using the bilinear interpolation method based on distance information of the four points A, B, C, and D. After the distances from the plurality of circle centers to the obstacle are separately calculated in the foregoing manner, the shortest distance is used as the distance $d_{min.i}$ from the road point i to the obstacle.

The constraint cost is used to determine whether each road point on the candidate path is within a constraint of the obstacle avoidable range. If the road point exceeds the obstacle avoidable range, a constraint cost of the point is calculated; or otherwise, the constraint cost is 0. Specifically, an overall constraint cost of each candidate path may be obtained by summing up constraint costs of all road points, as shown in a formula (3):

$$cost_{margin} = \sum_i \begin{cases} \dfrac{1.0}{pt_i.s}, \ pt_i, \ l < LM \ \text{or} \ pt_i.l > RM \\ 0.0, \ LM < pt_i.l < RM \end{cases} \tag{3}$$

$cost_{margin}$ is the constraint cost; $pt_i.s$ is a longitudinal coordinate value of the $i^{th}$ road point on the candidate path; $pt_i.l$ is a horizontal coordinate value of the $i^{th}$ road point; LM is a left constraint, that is, a horizontal coordinate value of a left boundary line of the obstacle avoidable range; and RM is a right constraint, that is, a horizontal coordinate value of a right boundary line of the obstacle avoidable range. Therefore, a larger quantity of road points on a particular candidate path outside the obstacle avoidable range and smaller longitudinal coordinate values of the road points outside the obstacle avoidable range indicate a higher constraint cost of the path; or if all the road points on the candidate path are within the obstacle avoidable range, the constraint cost is 0. Therefore, driving on a candidate path with a constraint cost of 0 can ensure that the ego vehicle travels in the obstacle avoidable range.

The switching cost is used to describe a deviation between the candidate path and the historical path. The switching cost may be divided into a shift switching cost and a zone switching cost.

The shift switching cost describes a change of a horizontal path of the candidate path relative to the historical path. In this embodiment, an absolute value of a difference between a horizontal shift of a goal point of a current candidate path and a horizontal shift of a goal point of a historical output path of a previous frame may be used as the shift switching cost. A formula is as follows:

$$cost_{lchange} = |goal_{old}.l - goal_{now}.l| \tag{4}$$

$cost_{lchange}$ is the shift switching cost; $goal_{old}$ is the horizontal shift of the goal point of the historical path, to be specific, a horizontal coordinate of the goal point of the historical path; and $goal_{now}$ is a horizontal shift of the goal point of the current candidate path, to be specific, a horizontal coordinate of the goal point of the current candidate path.

It should be understood that the horizontal shift is a degree of shifting away from a road centerline.

The zone switching cost describes a degree of a change in a large horizontal range of the candidate path. The zone switching cost is relatively low when the path jumps in adjacent zones, and is very high when the path jumps between left and right zones. In this case, the zone switching cost can be used to evaluate a significant change of the path.

Figure 16:
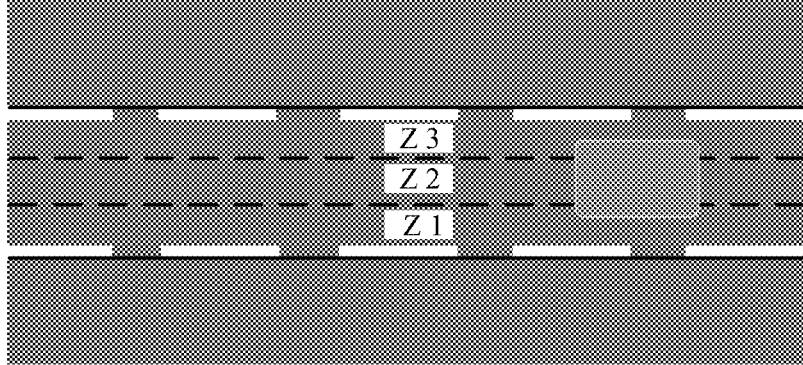
FIG. 16 is an example diagram of horizontal partitioning according to an embodiment of this application.

For example, based on a horizontal distance, the obstacle avoidable range may be divided into three zones: left Z1, middle Z2, and right Z3 shown in FIG. 16. When a horizontal obstacle avoidable range is 3 m and a horizontal coordinate of the road centerline is 0, the three zones may be divided in the following manner. To be specific, when the horizontal coordinate of the goal point is less than −0.5, the goal point is located in the zone 1 (Z1); when the horizontal coordinate of the goal point is greater than −0.5 and less than 0.5, the goal point is located in the zone 2 (Z2); and when the horizontal coordinate of the goal point is greater than 0.5, the goal point is located in the zone 3 (Z3).

$$zone = \begin{cases} 1, \text{goal}.l < -0.5 \\ 2, -0.5 \leq \text{goal}.l \leq 0.5 \\ 3, \text{goal}.l > 0.5 \end{cases} \quad (5)$$

zone represents a zone, and goal.l is a horizontal coordinate value of the goal point.

Based on the foregoing description, a zone switching cost value between the candidate path and the historical path may be calculated based on the following formula (6):

$$cost_{zone} = \begin{cases} 1.0, |zone_{old} - zone_{now}| > 1 \\ 0.0, |zone_{old} - zone_{now}| \leq 1 \end{cases} \quad (6)$$

$cost_{zone}$ is the zone switching cost, $zone_{old}$ is a zone in which the goal point of the historical path is located, and $zone_{now}$ is a zone in which the goal point of the candidate path is located.

It should be understood that, during actual operation, the obstacle avoidable range may alternatively be divided into four zones, five zones, six zones, or the like. A quantity of divided zones is not limited in this application. For ease of description, in this embodiment of this application, the obstacle avoidable range is divided into three zones. It should be further understood that, division of zones may be equal-length division or may be unequal-length division. This is not limited in this application.

It should be understood that, when the horizontal path is divided into more zones, for example, four zones, 1 or 2 may be used as a critical value. For example, when an absolute value of a difference between the zone in which the goal point of the historical path is located and the zone in which the goal point of the candidate path is located is greater than 1, the zone switching cost is 1; or if the absolute value is less than or equal to 1, the zone switching cost is 0. Alternatively, when the absolute value of the difference between the zone in which the goal point of the historical path is located and the zone in which the goal point of the candidate path is located is greater than 2, the zone switching cost is 1; or if the absolute value is less than or equal to 2, the zone switching cost is 0. Specific division of zones and determining of the critical value should be determined based on an actual road condition. This is not limited.

The horizontal shift cost is used to describe a degree of horizontal shifting of the candidate path away from the road centerline. Specifically, the cost may be described by using a horizontal shift of the goal point of the candidate path, as shown in a formula (7).

$$cost_{offset} = |goal_{now}.l| \quad (7)$$

$cost_{offset}$ is the horizontal shift cost; and $goal_{now}.l$ is the horizontal shift of the goal point of the current candidate path.

The smoothness cost is used to describe a degree of smoothness of the candidate path and is represented by a curvature of the candidate path. Specifically, the cost may be described by using an integration of a square of a curvature of each road point on the candidate path, as shown in a formula (8):

$$cost_{smooth} = \sum_i \frac{pt_i.curve^2}{pt_i.s} \quad (8)$$

$cost_{smooth}$ is the smoothness cost; $pt_i.curve$ is the curvature at the $i^{th}$ road point on the candidate path; and $pt_i.s$ is the longitudinal coordinate value of the $i^{th}$ road point on the candidate path. It should be understood that, a larger curvature indicates a higher cost.

Preferably, in this embodiment of this application, after the costs of each candidate path are calculated, a weighted summation result of the costs on each candidate path may be used as the final cost of the candidate path. Then, based on the final cost values of all the candidate paths, a candidate path with the lowest final cost is used as an optimal path of a current frame, and the optimal path of the current frame is the current obstacle avoidance path above.

Specifically, the final cost of each candidate path may be calculated based on a formula (9).

$$\begin{aligned} cost_{total} = &w_{back}*cost_{back} + w_{obj}*cost_{obj} + \\ &w_{margin}*cost_{margin} + w_{lchange}*cost_{lchange} + \\ &w_{zone}*cost_{zone} + w_{offset}*cost_{offset} + \\ &w_{smooth}*cost_{smooth} \end{aligned} \quad (9)$$

$cost_{total}$ is the final cost of the candidate path; $cost_{back}$ is the background cost; $w_{back}$ is a weight of the background cost; $cost_{obj}$ is the collision cost; $w_{obj}$ is a weight of the collision cost; $cost_{margin}$ is the constraint cost; $w_{margin}$ is a weight of the constraint cost; $cost_{lchange}$ is the shift switching cost; $w_{lchange}$ is a weight of the shift switching cost; $cost_{zone}$ is the zone switching cost; $w_{zone}$ is a weight of the zone switching cost; $cost_{offset}$ is the horizontal shift cost; $w_{offset}$ is a weight of the horizontal shift cost; $cost_{smooth}$ is the smoothness cost; and $w_{smooth}$ is a weight of the smoothness cost.

It should be understood that, when the final cost is calculated based on the solution in this embodiment of this application, impact of a plurality of costs is integrated, so that the optimal path of the current frame can meet requirements of various aspects.

Moreover, in a calculation process, the weight of the background cost and the weight of the collision cost may be set to be relatively large. In one aspect, the final cost of the optimal path is much less than that of another candidate path. If the ego vehicle slightly deviates from the optimal path in the actual traveling process, the final cost obviously increases. Therefore, the ego vehicle can travel stably on the path with the lowest cost. In another aspect, a path with the lowest cost also has an optimal collision cost and an optimal background cost, so that in the traveling process of the ego vehicle, when an obstacle on a side of the ego vehicle gradually approaches, the ego vehicle can slowly avoid the obstacle, thereby keeping a safe distance from the obstacle.

For example, the weights of the costs in this embodiment of this application may be set as follows:

$$w_{back} = 1.0 \times 10^6$$

$$w_{obj}=1.0\times10^6$$

$$w_{margin}=1.0\times10^{-1}$$

$$w_{lchange}=1.0\times10^{-6}$$

$$w_{zone}=1.0\times10^{-3}$$

$$w_{offset}=1.0\times10^{-3}$$

$$w_{smooth}=1.0\times10^{-6}$$

It should be understood that, in this embodiment of this application, the candidate path may be evaluated with reference to one or more of the foregoing costs based on an actual situation. It should be further understood that, values of the weights of the costs may be set based on an actual situation. This is not limited herein.

Operation S530. Output path arbitration result.

Figure 17:
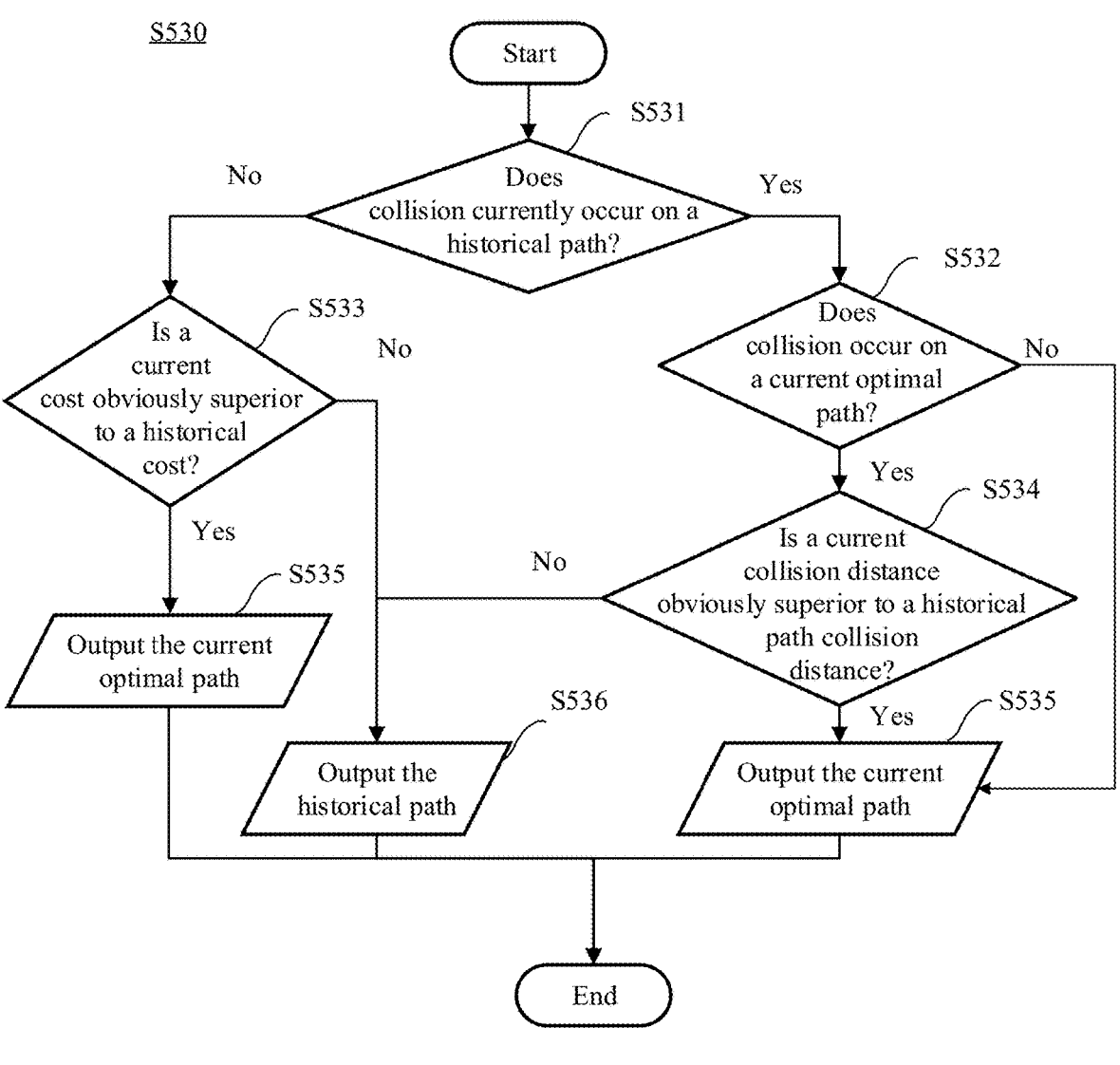
FIG. 17 is an example diagram of an arbitration method for outputting an obstacle avoidance path according to an embodiment of this application.

When the optimal path of the current frame, namely, the foregoing current obstacle avoidance path, is obtained, arbitration may be performed based on the historical path and the optimal path of the current frame, and a final obstacle avoidance path is output. A specific arbitration manner is shown in FIG. 17. It should be understood that the optimal path of the current frame is the foregoing current obstacle avoidance path.

FIG. 17 is an example diagram of an arbitration method for outputting an obstacle avoidance path according to an embodiment of this application. As shown in FIG. 17, the arbitration method is operation S530, including operations S531 to S536. The following describes these operations in detail.

Operation S531: Determine whether collision currently occurs on the historical path. If collision occurs, proceed to operation S532; or if no collision occurs, proceed to operation S533.

Operation S532: Determine whether collision occurs on the current optimal path. If collision occurs, proceed to operation S534; or if no collision occurs, proceed to operation S535.

Operation S533: Determine whether a cost of the current optimal path is obviously superior to a historical cost. If the cost of the current optimal path is obviously superior to the historical cost, proceed to operation S535; or if the cost of the current optimal path is not obviously superior to the historical cost, proceed to operation S536.

Operation S534: Determine whether a collision distance of the current optimal path is obviously superior to a historical collision distance. If the collision distance of the current optimal path is obviously superior to the historical collision distance, proceed to operation S535; or if the collision distance of the current optimal path is not obviously superior to the historical collision distance, proceed to operation S536.

Operation S535: Output the current optimal path.

Operation S536: Output the historical path.

Specifically, before arbitration is performed, first, the historical path needs to be regenerated in the current frame based on information about a goal point used for generating the historical path in the previous frame, and a final cost and a collision status of the historical path are calculated.

If no collision currently occurs on the historical path, the obstacle avoidance path to be output is determined based on the final cost of the current optimal path and a final cost of the historical path. If the final cost of the current optimal path is obviously superior to the final cost of the historical path, the current optimal path is used as the output obstacle avoidance path; or otherwise, the historical path continues to be used. It should be understood that, that the final cost of the current optimal path is superior to the final cost of the historical path means that the final cost of the current optimal path is less than the final cost of the historical path.

Figure 18:
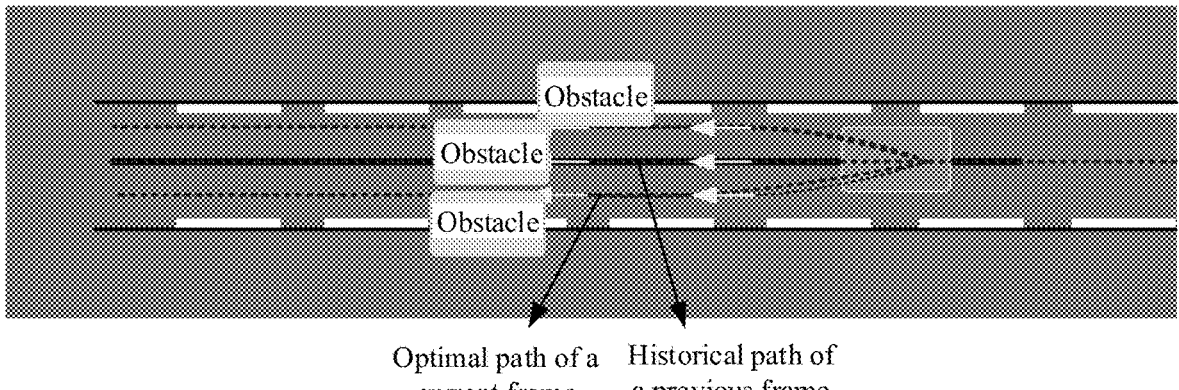
FIG. 18 is an example diagram of a scenario in which a historical path is still used upon all-collision of a candidate path according to an embodiment of this application.
Figure 19:
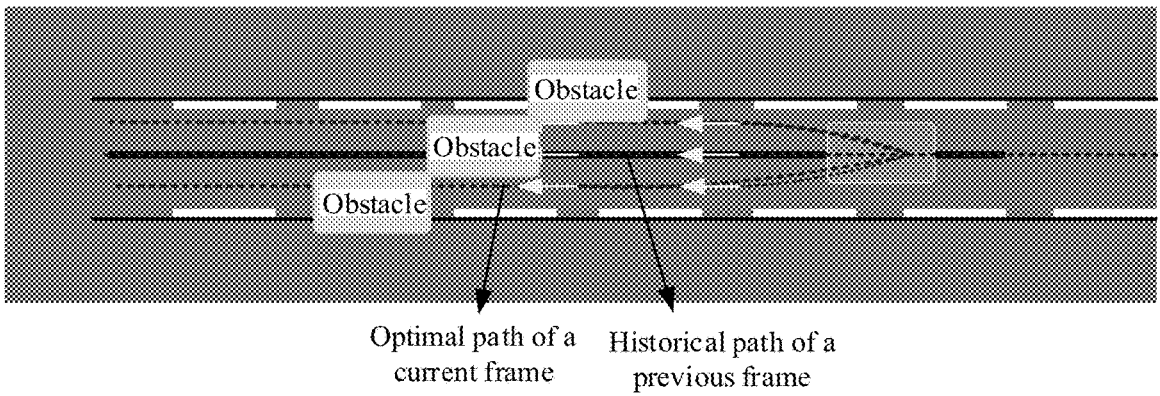
FIG. 19 is an example diagram of a scenario of switching to a current optimal path upon all-collision of a candidate path according to an embodiment of this application.

If collision currently occurs on the historical path, but no collision occurs on the optimal path of the current frame, the optimal path of the current frame is used as the currently output final path. It should be further understood that, if collision occurs on the optimal path of the current frame, it indicates that collision occurs on all paths of the current frame. In this case, if a collision distance of the optimal path of the current frame is close to the historical collision distance, as shown in FIG. 18, the historical path of the previous frame is still used. If the collision distance of the optimal path of the current frame is obviously superior to the historical collision distance, as shown in FIG. 19, the current optimal path is used as the output final obstacle avoidance path.

It should be understood that, that the collision distance of the optimal path of the current frame is obviously superior to the historical collision distance means that a difference obtained by subtracting the historical collision distance from the collision distance of the optimal path of the current frame is greater than or equal to a particular threshold, for example, 5 m.

That the final cost of the current optimal path is superior to the final cost of the historical path means that a ratio of the final cost of the current optimal path to the final cost of the historical path is less than or equal to a particular threshold, for example, 60%.

Operation S540: Perform time-domain smoothing on the path.

In this embodiment, after the final obstacle avoidance path is obtained through arbitration, time-domain smoothing may be further performed on the obstacle avoidance path.

In addition, in this embodiment, each path corresponds to a unique goal point. Therefore, time-domain smoothing may be performed on the obstacle avoidance path by using the goal point. Specifically, based on a smoothed sampling goal point $goal_{old}$ of the previous frame, (namely, the sampling goal point $goal_{old}$ of the historical path of the previous frame) and a final sampling goal point $goal_{final}$ selected in the current frame (namely, the sampling goal point $goal_{final}$ of the final obstacle avoidance path selected through arbitration), the time-domain smoothed sampling goal point $goal_{filter}$ is generated through inertia filtering.

Figure 20:
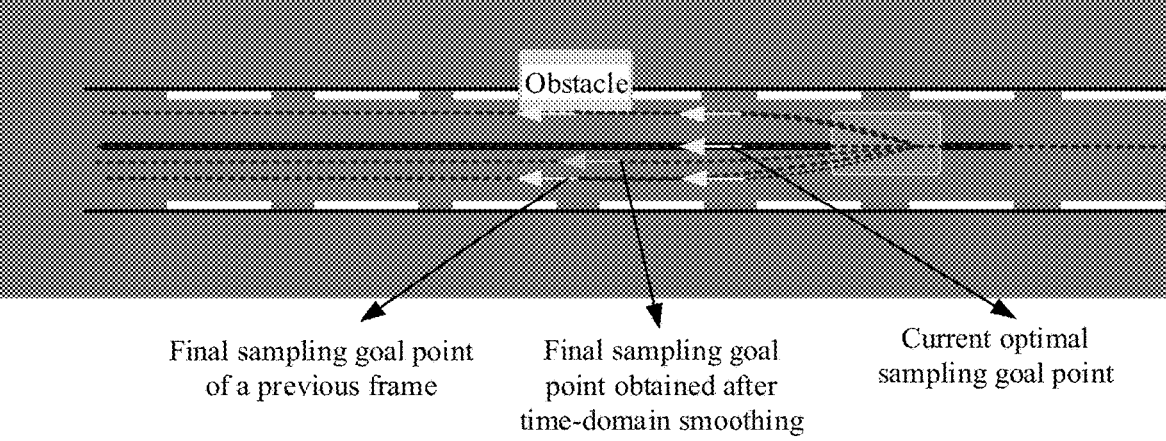
FIG. 20 is an example diagram of time-domain smoothing according to an embodiment of this application.

It should be understood that, when the final obstacle avoidance path is the historical path, the final sampling goal point selected in the current frame is the sampling goal point of the historical path. In this case, both a result obtained after time-domain smoothing and a result obtained without time-domain smoothing are the sampling goal point of the historical path. When the final obstacle avoidance path is the optimal path of the current frame, the final sampling goal point selected in the current frame is a current optimal sampling goal point. FIG. 20 is an example diagram of time-domain smoothing in this case. After the time-domain smoothed sampling goal point $goal_{filter}$ is generated, a three-segment path is regenerated based on the smoothed sampling goal point $goal_{filter}$, to obtain a finally output path.

A specific location of the smoothed goal point $goal_{filter}$ may be calculated based on formulas (10) and (11):

$$goal_{filter}.l=w_l*goal_{old}.l+(1-w_l)*goal_{final}.l \tag{10}$$

$$goal_{filter}.s=w_s*goal_{old}.s+(1-w_s)*goal_{final}.s \tag{11}$$

goal$_{filter}$.l is a horizontal location of the smoothed sampling goal point; goal$_{filter}$.s is a longitudinal location of the smoothed sampling goal point; goal$_{old}$.l is a horizontal location of the smoothed sampling goal point of the previous frame; goal$_{old}$.s is a longitudinal location of the smoothed sampling goal point of the previous frame; goal$_{final}$.l is a horizontal location of the final sampling goal point selected in the current frame; goal$_{final}$.s is a longitudinal location of the final sampling goal point selected in the current frame; and w$_l$ is a weight for smoothing in a horizontal direction, and w$_s$ is a weight for smoothing in a longitudinal direction.

It should be understood that, in this embodiment, the weights used for smoothing in the horizontal direction and the longitudinal direction may be set based on an actual situation. For example, the weights for smoothing in the horizontal direction and the longitudinal direction may be 1. To be specific, a location of the smoothed sampling goal point goal$_{filter}$ is the same as a location of the smoothed sampling goal point goal$_{old}$ of the previous frame, that is, the historical path is still used. The weights for smoothing in the horizontal direction and the longitudinal direction may be 0. To be specific, the location of the smoothed sampling goal point goal$_{filter}$ is the same as a location of the final sampling goal point goal$_{final}$ selected in the current frame, that is, the sampling goal point of the final path selected based on path arbitration is used as the smoothed sampling goal point goal$_{filter}$. When the result of path arbitration is that the optimal path of the current frame is used, that is, the final path selected in the current frame is the optimal path of the current frame, the weight may alternatively be any value in 0 to 1 based on an actual road condition, so that the ego vehicle can comprehensively consider conditions of the historical path and the optimal path of the current frame, to prevent interframe hopping generated in a case of direct operation to the optimal path. It should be understood that the weights in the horizontal direction and the vertical direction may be the same, or may be different. For example, in this embodiment, the following may be set: w$_l$=0.92, and w$_s$=0.85.

In this embodiment, in one aspect, a horizontal background cost potential field in the near-field range is generated, so that when an obstacle on a side of the ego vehicle gradually approaches horizontally, the ego vehicle can slowly avoid the obstacle, and keep a safe distance from the obstacle. In another aspect, the invalid grids are filtered out, so that the ego vehicle is effectively prevented from performing unreasonable avoidance caused by occupied grids herein. In still another aspect, the background cost in combination with a path arbitration policy can ensure stable obstacle avoidance of the ego vehicle.

Figure 21:
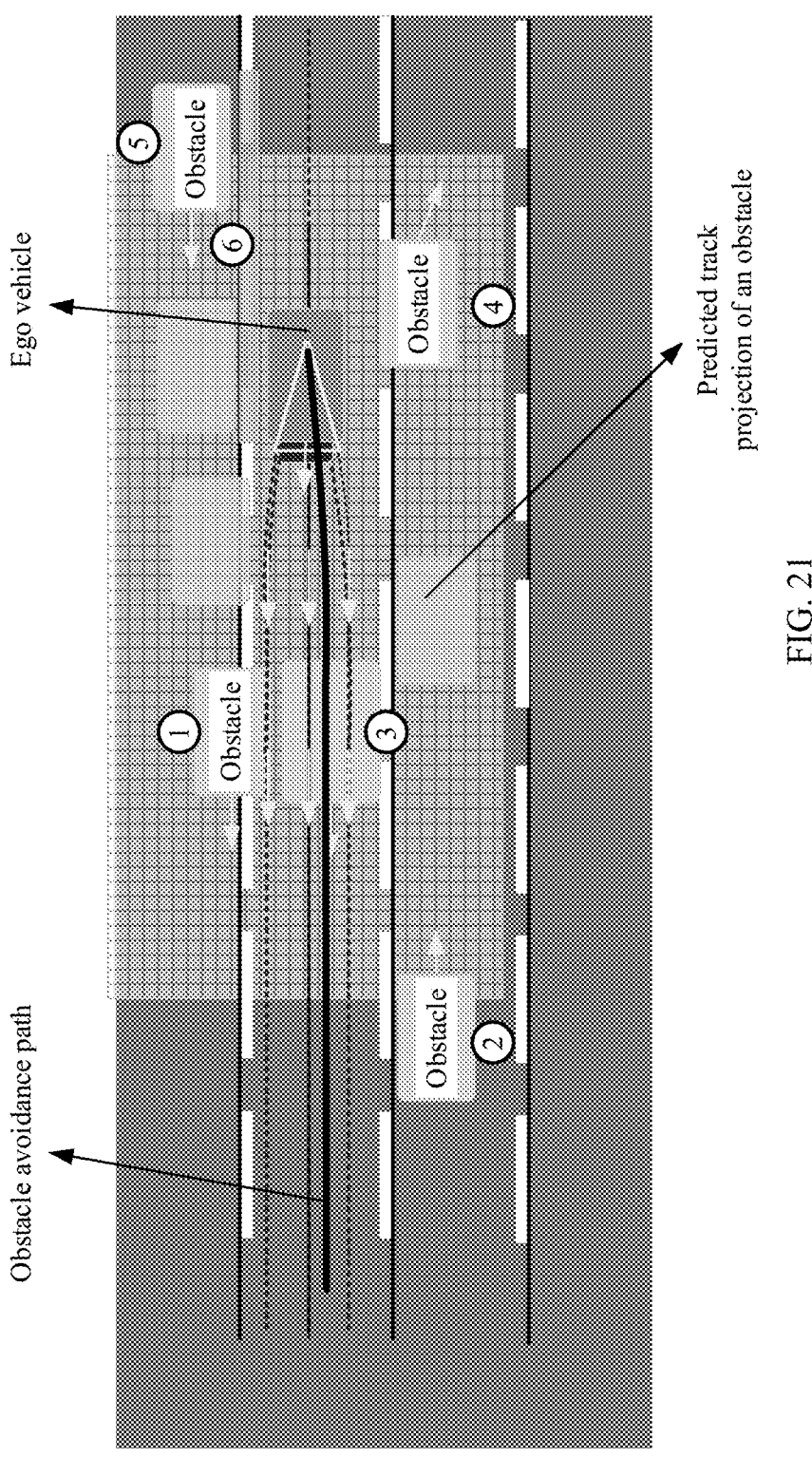
FIG. 21 is an example diagram of an obstacle avoidance path generation result in a complex and narrow scenario according to an embodiment of this application.

For example, in the scenario shown in FIG. 2, when vehicles 4 and 5 are at locations shown in the figure, the ego vehicle may travel in the middle of the two vehicles. When the vehicle 5 on the right slowly approaches the ego vehicle, a lowest value of the V-shaped potential field formed by the background costs gradually moves to the left, so that the ego vehicle selects a candidate path on the left within a constraint of the obstacle avoidable range, and keeps a 1-m horizontal distance from the obstacle to ensure safety of the ego vehicle. In addition, because the weight of the background cost is very high, for example, 10$^6$, when the obstacle slightly approaches, the background cost changes sharply. As a result, the final cost also changes obviously. In this way, the optimal path cost obtained in each frame is definitely less than 60% of the historical optimal path cost, and switching of the path from the historical path to the current optimal path is continuously triggered, to enable the ego vehicle to avoid the obstacle in time. In addition, the collision cost is also used during evaluation of the entire candidate path. For example, existence of obstacle 1 enables candidate paths near the obstacle 1 to encounter collision, and the collision cost thereof is also very high. Therefore, based on a weighted sum of a plurality of costs such as the background cost and the collision cost, the finally output obstacle avoidance path in this scenario shifts to the left, as shown in FIG. 21, to effectively avoid an obstacle that needs to be avoided.

The foregoing is a specific example in which this embodiment of this application is applied to a complex and narrow traffic scenario. It should be understood that, with reference to the horizontal background cost potential field (namely, the first horizontal background cost potential field) in the near-field range and the collision cost, this embodiment of this application may be further applied to a simple and high-speed scenario for quick obstacle avoidance.

Figure 22:
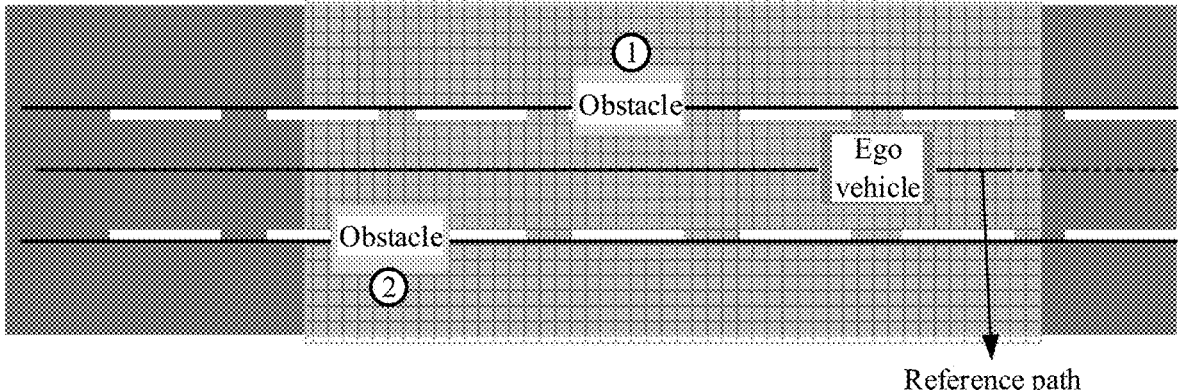
FIG. 22 is an example diagram of a simple city road scenario according to an embodiment of this application.

FIG. 22 is an example diagram of a simple city road scenario according to an embodiment of this application. As shown in FIG. 22, when an ego vehicle travels fast on a structural road, a small quantity of dynamic and static obstacles (numbered 1 and 2) exist in an obstacle avoidable range. However, these obstacles are cross-arranged on the road in front of the ego vehicle, and the ego vehicle needs to avoid obstacles quickly along small S curves. It should be understood that, in this scenario, a reference path, a horizontal obstacle avoidable range, sizes, locations, and speeds of all the obstacles, and an occupied map including predicted tracks are all known.

For ease of description, a complex and narrow scenario is denoted as a scenario 1, and a simple and high-speed scenario is denoted as a scenario 2.

In an embodiment, for the scenario 2, path planning may be performed with reference to the foregoing horizontal background cost potential field (that is, the first horizontal background cost potential field) and the collision cost in the near-field range. In addition, path planning may also be performed with reference to one or more of the following: filtering-out of invalid grids, consideration of a plurality of other costs to obtain a final cost, path arbitration, time-domain smoothing, and the like.

The following briefly describes a path planning method in the scenario 2 in a preferred manner.

Figure 23:
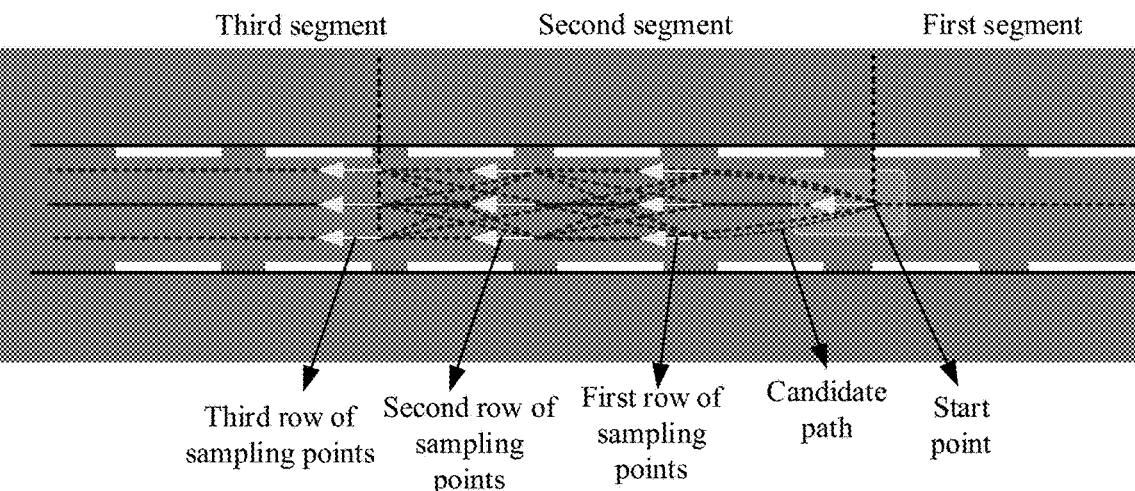
FIG. 23 is an example diagram of another candidate path generation scenario according to an embodiment of this application.

In a preferred implementation, the planning method shown in FIG. 5 may also be applied to the scenario 2 shown in FIG. 22. However, a specific candidate path generation manner used when the planning method is applied to the scenario 2 is different from that (operation S510) used when the planning method is applied to the scenario 1. FIG. 23 is an example diagram of another candidate path generation scenario according to an embodiment of this application. The following describes candidate path generation in the scenario 2 in detail by using a specific example.

Specifically, in the scenario 2, it may also be assumed that the reference path is a centerline of a current lane, a lane width, that is, the obstacle avoidable range, is 3.5 m, and widths of left and right sides of the lane centerline are both 1.75 m. In the scenario 2, a method for generating a start point and a goal point is basically consistent with that in the scenario 1, and a main difference lies in that 11 goal points can be generated in each row in the scenario 1, but in the scenario 2, three goal points are generated in each row.

After a feature vector is determined, a fully-connected candidate path is generated by connecting the reference path, a historical path, and the feature vector. The path is divided into three segments, including a historical segment, a fully-connected segment, and an extension segment. The historical segment is obtained by intercepting the historical path behind the start point. The fully-connected segment is generated by connecting the start point and a plurality of rows of sampling points. In a specific method, the start point is separately connected to the first row of sampling points and then the first row of sampling points are separately connected to the second row of sampling points. By analogy, a connection relationship between the plurality of rows of sampling points can be obtained. For example, there are three sampling points in each row, and there are a total of three rows of sampling points. In this case, 3*(3*3)*(3*3) =243 candidate tracks can be obtained. Segments of the fully-connected segment are linked by using a cubic polynomial equation, and a vector constraint of the goal points needs to be satisfied during linking. The extension segment is obtained by translating the reference path to be behind the sampling points corresponding to the fully-connected segment. The three segments of the path are connected in sequence, and the entire candidate path is obtained in a splicing manner. In this embodiment, a total of 243 candidate paths are generated.

Finally, spatial smoothing is performed on each candidate path. For a smoothing manner, refer to the description of the scenario 1. Details are not described again.

It should be understood that the foregoing is merely used as an example, and is used only for clearly describing a difference between the candidate path generation manners in the scenario 1 and the scenario 2, and cannot be construed as a limitation on this application. It should be understood that, a quantity of goal points in each row, a quantity of rows of goal points, and a quantity of generated candidate paths may be determined with reference to an actual situation, and are not limited.

In the scenario 2, for evaluation of the candidate paths (operation S520) and arbitration of an output path (operation S530), refer to the description of the specific implementation of the scenario 1.

In addition, because candidate path connection manners are different, path time-domain smoothing (operation S540) in path planning of the scenario 2 and the scenario 1 is slightly different.

Specifically, in the scenario 2, a smoothed sampling goal point cluster $goal_{old}$ of a previous frame is recorded, and $goal_{old}$ herein includes three goal points. Each row of sampling points corresponds to one goal point. Based on final sampling goal points (three points) selected in a current frame, a time-domain smoothed sampling goal point cluster is generated through inertia filtering. A three-segment path is regenerated based on the smoothed sampling goal point cluster, to obtain the final output path. Formulas and parameters for time-domain smoothing of the corresponding goal points are the same as the formulas (10) and (11).

In the scenario 2, when the ego vehicle is in a scenario in which two obstacles are cross-arranged, the ego vehicle has a sufficiently high degree of freedom in horizontal avoidance. Therefore, a sufficiently long collision-free traveling track may be obtained through planning in the foregoing manner, so that the ego vehicle quickly avoids the obstacles to pass through the traffic scenario. In addition, in a process of quickly avoiding the obstacles, the ego vehicle can keep a sufficient lateral distance from the obstacles and ensure path stability.

Figure 24:
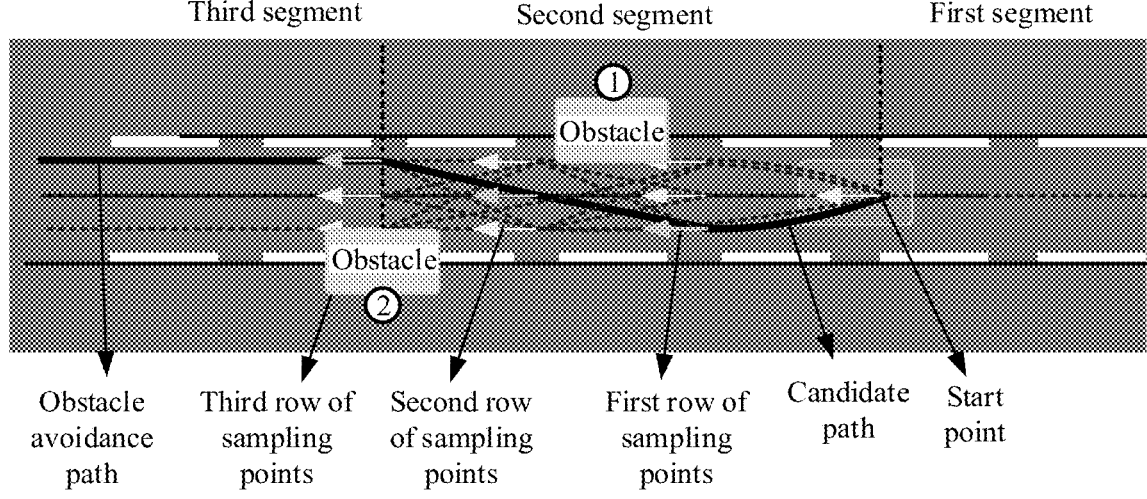
FIG. 24 is an example diagram of an obstacle avoidance path generation result in a simple city road scenario according to an embodiment of this application.

Specifically, an obstacle avoidance path shown in FIG. 24 may be generated in this embodiment. Because the candidate path is generated by using the full-connection method in this embodiment, there are a large quantity of candidate forms of the path, and a solution space is fully expanded, so that a collision-free track avoiding a plurality of objects can be obtained. Moreover, the path is evaluated based on the collision cost, so that the currently planned obstacle avoidance path (an optimal candidate path) can keep a safe distance of 0.7 m from the obstacles 1 and 2 on the entire path. In addition, in a traveling process, when passing a side of an obstacle, the ego vehicle adjusts a traveling path based on a background cost, so that the ego vehicle keeps a safe distance of 1 m from the obstacle. In this way, a collision-free path is formed in a longitudinal range in which the obstacles 1 and 2 are located, and the ego vehicle quickly passes the two obstacles. Moreover, if the path planned by the ego vehicle at the illustrated location enables the ego vehicle to keep the safe distance of 1 m when the ego vehicle moves to sides of the obstacles 1 and 2, an output path arbitration policy arbitrates between the historical path and the path replanned in the traveling process. In this way, the historical path is still used, and the path is not switched, thereby quickly avoiding the obstacles.

However, in the scenario 2, if the path planning method used in the scenario 1 is used, generated candidate paths have a relatively small quantity of forms (as shown in FIG. 7). In this case, when selection is performed among the plurality of candidate paths, a collision-free traveling path cannot be directly obtained. In the traveling process, the ego vehicle can only separately avoid the obstacles 1 and 2. Consequently, the planned path can avoid the obstacle 1 at the beginning, but collision with the obstacle 2 occurs in a front segment of the path (to be specific, the obstacle 2 is located on the third segment of a lowest path in FIG. 7). In this case, the traveling path with collision affects a back-end speed planner, causing the ego vehicle to decelerate, and the ego vehicle can only drive at a low speed in this scenario.

Figure 25:
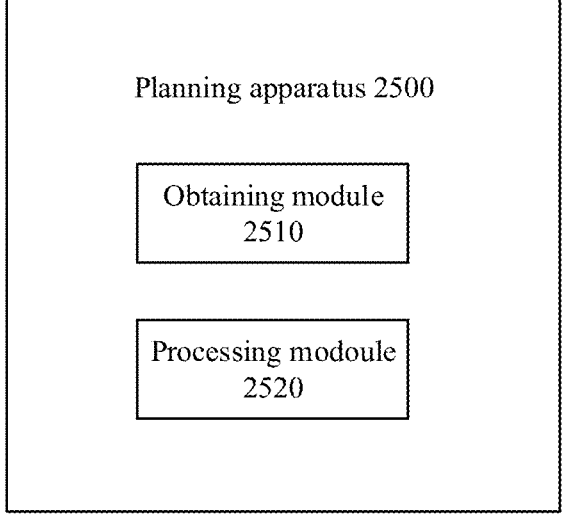
FIG. 25 is an example diagram of an apparatus for planning an obstacle avoidance path of a traveling apparatus according to an embodiment of this application.

FIG. 25 is an example diagram of an apparatus for planning an obstacle avoidance path of a traveling apparatus according to an embodiment of this application. As shown in FIG. 25, the planning apparatus 2500 includes an obtaining module 2510 and a processing module 2520.

The obtaining module 2510 is configured to obtain a distance map, where the distance map includes a plurality of first grids, each of the plurality of first grids is used to record a distance from the first grid to a closest first grid occupied by an obstacle; and the processing module 2520 is configured to: determine a first horizontal background cost potential field in a near-field range based on the distance map, where the near-field range is a range in which a longitudinal distance from the traveling apparatus is less than or equal to a first threshold, the first horizontal background cost potential field is a first repulsion field formed by an obstacle at a horizontal location on the traveling apparatus, the first horizontal background cost potential field includes a target minimum-value point, background costs on two horizontal sides of the target minimum-value point feature monotonicity, and the background cost represents a near-field horizontal collision cost caused by the obstacle at the horizontal location in the near-field range to the traveling apparatus; and determine a current obstacle avoidance path based on the first horizontal background cost potential field.

In an embodiment, the determining a first horizontal background cost potential field in a near-field range based on the distance map includes: determining a second horizontal background cost potential field in the near-field range based on the distance map, where the second horizontal background cost potential field is a second repulsion field formed by the obstacle at the horizontal location on the traveling apparatus, and the second horizontal background cost potential field includes at least one minimum-value point; determining the target minimum-value point from the at least one minimum-value point; and performing monotonicity processing on the background costs on the two horizontal sides of the target minimum-value point, to generate the first horizontal background cost potential field, where a slope of the monotonicity processing is greater than or equal to a second threshold.

In an embodiment, there is no obstacle between the target minimum-value point and the traveling apparatus.

In an embodiment, before the obtaining a distance map, the obtaining module 2510 may be further configured to: obtain an occupied map, where the occupied map includes a plurality of second grids, and each of the plurality of second grids is used to record a probability that there is an obstacle in the second grid; and the processing module 2520 may be further configured to: obtain the distance map based on the occupied map.

In an embodiment, the obtaining the distance map based on the occupied map includes: filtering out the second grid located in a first zone in the occupied map, where the first zone is located in front of the traveling apparatus, and if there is an obstacle in the first zone, the traveling apparatus is incapable of avoiding the obstacle in the first zone; and obtaining the distance map based on the occupied map obtained after the filtering-out is performed.

In an embodiment, before the determining a second horizontal background cost potential field in the near-field range based on the distance map, the processing module 2520 may be further configured to: generate a feature vector, where the feature vector includes a path start point and a sampling goal point; and generate a plurality of candidate paths based on a reference path, a historical path, and the feature vector; and the determining a second horizontal background cost potential field in the near-field range based on the distance map includes: shifting the reference path horizontally based on the sampling goal point, to generate a plurality of virtual parallel paths; calculating, based on the distance map, a distance from each road point on each of the plurality of virtual parallel paths in the near-field range to a closest obstacle; calculating a background cost of each virtual parallel path based on a minimum value of the distance on the virtual parallel path; and generating the second horizontal background cost potential field in the near-field range based on the background costs of the plurality of virtual parallel paths in the near-field range.

In an embodiment, before the determining a current obstacle avoidance path based on the first horizontal background cost potential field, the processing module 2520 is further configured to: calculate, based on the distance map, one or more of a collision cost, a constraint cost, a switching cost, a horizontal shift cost, or a smoothness cost on each of the plurality of candidate paths, where the collision cost is used to evaluate whether the traveling apparatus collides when traveling on the candidate path, the constraint cost is used to evaluate whether each road point on the candidate path is in an obstacle avoidable range, the switching cost is used to evaluate a deviation between the candidate path and the historical path, the horizontal shift cost is used to evaluate a degree of a horizontal shift of the candidate path from a road centerline, and the smoothness cost is used to evaluate smoothness of the candidate path; and the determining a current obstacle avoidance path based on the first horizontal background cost potential field includes: calculating a final cost on each candidate path based on a background cost in the first horizontal background cost potential field, or based on a background cost in the first horizontal background cost potential field and one or more of the collision cost, the constraint cost, the switching cost, the horizontal shift cost, or the smoothness cost; and determining the current obstacle avoidance path based on the final cost.

In an embodiment, the processing module 2520 is further configured to: determine a final obstacle avoidance path based on an arbitration result between the historical path and the current obstacle avoidance path.

In an embodiment, the determining a final obstacle avoidance path based on an arbitration result between the historical path and the current obstacle avoidance path includes: using the current obstacle avoidance path as the final obstacle avoidance path if collision occurs on the historical path but not on the current obstacle avoidance path; or using a path with a larger collision distance in the current obstacle avoidance path and the historical path as the final obstacle avoidance path if collision occurs on both the historical path and the current obstacle avoidance path and an absolute value of a difference between a collision distance of the current obstacle avoidance path and a collision distance of the historical path is greater than or equal to a third threshold; or using the historical path as the final obstacle avoidance path if collision occurs on both the historical path and the current obstacle avoidance path and an absolute value of a difference between a collision distance of the current obstacle avoidance path and a collision distance of the historical path is less than a third threshold; or using the current obstacle avoidance path as the final obstacle avoidance path if no collision occurs on the historical path and a ratio of the final cost of the current obstacle avoidance path to a cost of the historical path is less than or equal to a fourth threshold; or using the historical path as the final obstacle avoidance path if no collision occurs on the historical path and a ratio of the final cost of the current obstacle avoidance path to a cost of the historical path is greater than a fourth threshold, where the collision distance is a shortest longitudinal distance in longitudinal distances of all road points in a collision state on each candidate path.

In an embodiment, the processing module 2520 may be further configured to perform time-domain smoothing based on the historical path and the final obstacle avoidance path.

In an embodiment, the planning apparatus 2500 may further include an output module, configured to output the final obstacle avoidance path to a speed planner, where the speed planner is configured to perform speed planning based on the final obstacle avoidance path and obstacle information on the final obstacle avoidance path.

Figure 26:
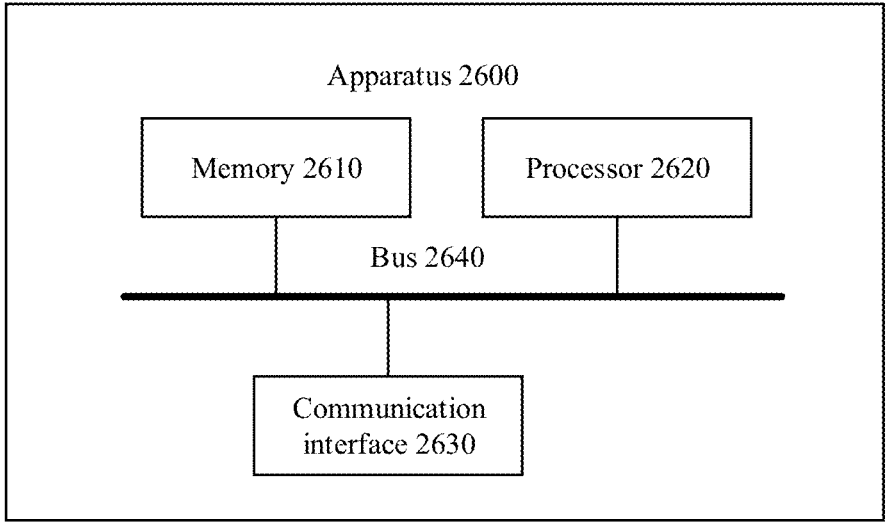
FIG. 26 is an example block diagram of a hardware structure of an apparatus for planning an obstacle avoidance path according to an embodiment of this application.

FIG. 26 is an example block diagram of a hardware structure of an apparatus for planning an obstacle avoidance path according to an embodiment of this application. The apparatus 2600 (the apparatus 2600 may be specifically a computer device) includes a memory 2610, a processor 2620, a communication interface 2630, and a bus 2640. Communication connections between the memory 2610, the processor 2620, and the communication interface 2630 are implemented through the bus 2640.

The memory 2610 may be a read-only memory (ROM), a static storage device, a dynamic storage device, or a random access memory (RAM). The memory 2610 may store a program. When the program stored in the memory 2610 is executed by the processor 2620, the processor 2620 is configured to perform the operations of the planning method in embodiments of this application.

The processor 2620 may use a general-purpose central processing unit (CPU), a microprocessor, an application-specific integrated circuit (ASIC), a graphics processing unit (GPU), or one or more integrated circuits, and is configured to execute a related program, to implement the planning method in the method embodiments of this application.

The processor 2620 may alternatively be an integrated circuit chip and has a signal processing capability. In an implementation process, the operations of the planning method in this application may be completed by using a hardware integrated logic circuit or an instruction in a form of software in the processor 2620.

The processor 2620 may alternatively be a general-purpose processor, a digital signal processor (DSP), an application-specific integrated circuit (ASIC), a field programmable gate array (FPGA) or another programmable logical device, a discrete gate or transistor logic device, or a discrete hardware component. The processor 2620 may implement or perform the methods, the operations, and logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or may be performed and completed by using a combination of hardware and software modules in the decoding processor. The software module may be located in a storage medium mature in the art, such as a random access memory, a flash memory, a read-only memory, a programmable read-only memory, an electrically erasable programmable memory, or a register. The storage medium is located in the memory 2610. The processor 2620 reads information in the memory 2610, and completes, in combination with the hardware of the processor 2620, the functions that need to be performed by the modules included in the planning apparatus in embodiments of this application, or performs the planning method in the method embodiments of this application.

The communication interface 2630 uses a transceiver apparatus, for example but not for limitation, a transceiver, to implement communication between the apparatus 1000 and another device or a communication network, for example, implement functions of the obtaining module 2510 and the output module.

The bus 2640 may include a path for information transmission between various components (for example, the memory 2610, the processor 2620, and the communication interface 2630) of the apparatus 2600.

An embodiment of this application further provides a vehicle, including the foregoing apparatus 2500 or 2600 for planning an obstacle avoidance path. The apparatus 2500 or 2600 can perform any one of the foregoing planning methods, to enable the vehicle to travel stably and keep a safe distance from a vehicle in a horizontal direction in a complex and narrow scenario. It should be understood that the vehicle may be an electric vehicle, for example, a pure electric vehicle, an extended-range electric vehicle, a hybrid electric vehicle, a fuel cell vehicle, or a new energy vehicle. This is not specifically limited in this application.

An embodiment of this application further provides a computer system. Any one of the foregoing planning methods (algorithms) can run on the computer system. A computing capability of a computer should ensure that a rate of updating any one of the foregoing planning algorithms reaches a particular value, for example, 30 Hz. In this way, path planning can be performed based on a real-time environmental condition, to ensure safe and stable operation of the traveling apparatus.

Unless otherwise defined, all technical and scientific terms used in this specification have same meanings as those usually understood by a person skilled in the art of this application. The terms used in the specification of this application are merely for the purpose of describing specific embodiments, and are not intended to limit this application.

It should be understood that first, second, third, fourth, and various digital numbers in this specification are merely used for distinction for ease of description, but are not intended to limit the scope of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes various media that can store program code, for example, a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A planning method for planning an obstacle avoidance path of a traveling apparatus, comprising:
   determining a first horizontal background cost potential field in a near-field range based on a distance map, wherein the near-field range is a range in which a longitudinal distance from the traveling apparatus is less than or equal to a first threshold, the first horizontal background cost potential field is a first repulsion field formed by an obstacle at a horizontal location on the traveling apparatus, the first horizontal background cost potential field comprises a target minimum-value point, background costs on two horizontal sides of the target minimum-value point feature monotonicity, and the background cost represents a near-field horizontal collision cost caused by the obstacle at the horizontal location in the near-field range to the traveling apparatus; and
   determining a current obstacle avoidance path based on the first horizontal background cost potential field, wherein the traveling apparatus navigates to avoid the obstacle according to the current obstacle avoidance path.

2. The planning method according to claim 1, wherein the determining a first horizontal background cost potential field in a near-field range based on the distance map comprises:
   determining a second horizontal background cost potential field in the near-field range based on the distance map, wherein the second horizontal background cost potential field is a second repulsion field formed by the obstacle at the horizontal location on the traveling apparatus, and the second horizontal background cost potential field comprises at least one minimum-value point;
   determining the target minimum-value point from the at least one minimum-value point; and
   performing monotonicity processing on the background costs on the two horizontal sides of the target minimum-value point, to generate the first horizontal background cost potential field, wherein a slope of the monotonicity processing is greater than or equal to a second threshold.

3. The planning method according to claim 2, further comprising:
   before the determining a second horizontal background cost potential field in the near-field range based on the distance map, generating a feature vector, wherein the feature vector comprises a path start point and a sampling goal point; and
   generating a plurality of candidate paths based on a reference path, a historical path, and the feature vector; and
   the determining a second horizontal background cost potential field in the near-field range based on the distance map comprises:

shifting the reference path horizontally based on the sampling goal point, to generate a plurality of virtual parallel paths;
   calculating, based on the distance map, a distance from each road point on each of the plurality of virtual parallel paths in the near-field range to a closest obstacle;
   calculating a background cost of each virtual parallel path based on a minimum value of the distance on the virtual parallel path; and
   generating the second horizontal background cost potential field in the near-field range based on the background costs of the plurality of virtual parallel paths in the near-field range.

4. The planning method according to claim 3, further comprising:
   before the determining a current obstacle avoidance path based on the first horizontal background cost potential field, calculating, based on the distance map, one or more of a collision cost, a constraint cost, a switching cost, a horizontal shift cost, or a smoothness cost on each of the plurality of candidate paths, wherein
   the collision cost is used to evaluate whether the traveling apparatus collides when traveling on the candidate path, the constraint cost is used to evaluate whether each road point on the candidate path is in an obstacle avoidable range, the switching cost is used to evaluate a deviation between the candidate path and the historical path, the horizontal shift cost is used to evaluate a degree of a horizontal shift of the candidate path from a road centerline, and the smoothness cost is used to evaluate smoothness of the candidate path; and
   the determining a current obstacle avoidance path based on the first horizontal background cost potential field comprises:
   calculating a final cost for each candidate path based on a background cost in the first horizontal background cost potential field, or based on a background cost in the first horizontal background cost potential field and one or more of the collision cost, the constraint cost, the switching cost, the horizontal shift cost, or the smoothness cost; and
   determining the current obstacle avoidance path based on the final cost.

5. The planning method according to claim 1, wherein there is no obstacle between the target minimum-value point and the traveling apparatus.

6. The planning method according to claim 1, further comprising:
   obtaining the distance map, wherein the distance map comprises a plurality of first grids, each of the plurality of first grids is used to record a distance from the first grid to a closest first grid occupied by an obstacle;
   before the obtaining a distance map, obtaining an occupied map, wherein the occupied map comprises a plurality of second grids, and each of the plurality of second grids is used to record a probability that there is an obstacle in the second grid; and
   the obtaining a distance map comprises:
   obtaining the distance map based on the occupied map.

7. The planning method according to claim 6, wherein the obtaining the distance map based on the occupied map comprises:
   filtering out the second grid located in a first zone in the occupied map, wherein the first zone is located in front of the traveling apparatus, and if there is an obstacle in the first zone, the traveling apparatus is incapable of avoiding the obstacle in the first zone; and obtaining the distance map based on the occupied map obtained after the filtering out is performed.

8. The planning method according to claim 1, further comprising:

determining a final obstacle avoidance path based on an arbitration result between a historical path and the current obstacle avoidance path.

9. The planning method according to claim 8, wherein the determining a final obstacle avoidance path based on an arbitration result between the historical path and the current obstacle avoidance path comprises:

using the current obstacle avoidance path as the final obstacle avoidance path if collision occurs on the historical path but not on the current obstacle avoidance path; or using a path with a larger collision distance in the current obstacle avoidance path and the historical path as the final obstacle avoidance path if collision occurs on both the historical path and the current obstacle avoidance path and an absolute value of a difference between a collision distance of the current obstacle avoidance path and a collision distance of the historical path is greater than or equal to a third threshold; or using the historical path as the final obstacle avoidance path if collision occurs on both the historical path and the current obstacle avoidance path and an absolute value of a difference between a collision distance of the current obstacle avoidance path and a collision distance of the historical path is less than a third threshold; or using the current obstacle avoidance path as the final obstacle avoidance path if no collision occurs on the historical path and a ratio of a final cost of the current obstacle avoidance path to a cost of the historical path is less than or equal to a fourth threshold; or using the historical path as the final obstacle avoidance path if no collision occurs on the historical path and the ratio of the final cost of the current obstacle avoidance path to the cost of the historical path is greater than a fourth threshold, wherein the collision distance is a shortest longitudinal distance in longitudinal distances of all road points in a collision state on each candidate path.

10. A non-transitory computer-readable medium, wherein the computer-readable medium stores computer program code; and when the computer program code is run on a computer, the computer is enabled to perform the planning method according to claim 1.

11. A planning apparatus for planning an obstacle avoidance path of a traveling apparatus, wherein the apparatus comprises:

one or more processors; and a memory coupled to the one or more processors and storing instructions, which when executed by the one or more processors, configures the planning apparatus to:

obtain a distance map, wherein the distance map comprises a plurality of first grids, each of the plurality of first grids is used to record a distance from the first grid to a closest first grid occupied by an obstacle; and determine a first horizontal background cost potential field in a near-field range based on the distance map, wherein the near-field range is a range in which a longitudinal distance from the traveling apparatus is less than or equal to a first threshold, the first horizontal background cost potential field is a first repulsion field formed by an obstacle at a horizontal location on the traveling apparatus, the first horizontal background cost potential field comprises a target minimum-value point, background costs on two horizontal sides of the target minimum-value point feature monotonicity, and the background cost represents a near-field horizontal collision cost caused by the obstacle at the horizontal location in the near-field range to the traveling apparatus; and determine a current obstacle avoidance path based on the first horizontal background cost potential field, wherein the traveling apparatus navigates to avoid the obstacle according to the current obstacle avoidance path.

12. The planning apparatus according to claim 11, wherein the determining a first horizontal background cost potential field in a near-field range based on the distance map comprises: determining a second horizontal background cost potential field in the near-field range based on the distance map, wherein the second horizontal background cost potential field is a second repulsion field formed by the obstacle at the horizontal location on the traveling apparatus, and the second horizontal background cost potential field comprises at least one minimum-value point; determining the target minimum-value point from the at least one minimum-value point; and performing monotonicity processing on the background costs on the two horizontal sides of the target minimum-value point, to generate the first horizontal background cost potential field, wherein a slope of the monotonicity processing is greater than or equal to a second threshold.

13. The planning apparatus according to claim 12, wherein before the determining a second horizontal background cost potential field in the near-field range based on the distance map, the planning apparatus is further configured to:

generate a feature vector, wherein the feature vector comprises a path start point and a sampling goal point; and generate a plurality of candidate paths based on a reference path, a historical path, and the feature vector; and the determining a second horizontal background cost potential field in the near-field range based on the distance map comprises:

shifting the reference path horizontally based on the sampling goal point, to generate a plurality of virtual parallel paths; calculating, based on the distance map, a distance from each road point on each of the plurality of virtual parallel paths in the near-field range to a closest obstacle; calculating a background cost of each virtual parallel path based on a minimum value of the distance on the virtual parallel path; and generating the second horizontal background cost potential field in the near-field range based on the background costs of the plurality of virtual parallel paths in the near-field range.

14. The planning apparatus according to claim 13, wherein before the determining a current obstacle avoidance path based on the first horizontal background cost potential field, the planning apparatus is further configured to:

calculate, based on the distance map, one or more of a collision cost, a constraint cost, a switching cost, a horizontal shift cost, or a smoothness cost on each of the plurality of candidate paths, wherein the collision cost is used to evaluate whether the traveling apparatus collides when traveling on the candidate path, the constraint cost is used to evaluate whether each road point on the candidate path is in an obstacle avoidable range, the switching cost is used to evaluate a deviation between the candidate path and the historical path, the horizontal shift cost is used to evaluate a degree of a horizontal shift of the candidate path from a road centerline, and the smoothness cost is used to evaluate smoothness of the candidate path; and the determining a current obstacle avoidance path based on the first horizontal background cost potential field comprises:

calculating a final cost for each candidate path based on a background cost in the first horizontal background cost potential field, or based on a background cost in the first horizontal background cost potential field and one or more of the collision cost, the constraint cost, the switching cost, the horizontal shift cost, or the smoothness cost; and determining the current obstacle avoidance path based on the final cost.

15. The planning apparatus according to claim 11, wherein there is no obstacle between the target minimum-value point and the traveling apparatus.

16. The planning apparatus according to claim 11, wherein before the obtaining a distance map, the planning apparatus is further configured to:

obtain an occupied map, wherein the occupied map comprises a plurality of second grids, and each of the plurality of second grids is used to record a probability that there is an obstacle in the second grid; and obtain the distance map based on the occupied map.

17. The planning apparatus according to claim 16, wherein the obtaining the distance map based on the occupied map comprises:

filtering out the second grid located in a first zone in the occupied map, wherein the first zone is located in front of the traveling apparatus, and if there is an obstacle in the first zone, the traveling apparatus is incapable of avoiding the obstacle in the first zone; and obtaining the distance map based on the occupied map obtained after the filtering out is performed.

18. The planning apparatus according to claim 11, wherein the planning apparatus is further configured to:

determine a final obstacle avoidance path based on an arbitration result between a historical path and the current obstacle avoidance path.

19. The planning apparatus according to claim 18, wherein the determining a final obstacle avoidance path based on an arbitration result between the historical path and the current obstacle avoidance path comprises:

using the current obstacle avoidance path as the final obstacle avoidance path if collision occurs on the historical path but not on the current obstacle avoidance path; or using a path with a larger collision distance in the current obstacle avoidance path and the historical path as the final obstacle avoidance path if collision occurs on both the historical path and the current obstacle avoidance path and an absolute value of a difference between a collision distance of the current obstacle avoidance path and a collision distance of the historical path is greater than or equal to a third threshold; or using the historical path as the final obstacle avoidance path if collision occurs on both the historical path and the current obstacle avoidance path and an absolute value of a difference between a collision distance of the current obstacle avoidance path and a collision distance of the historical path is less than a third threshold; or using the current obstacle avoidance path as the final obstacle avoidance path if no collision occurs on the historical path and a ratio of a final cost of the current obstacle avoidance path to a cost of the historical path is less than or equal to a fourth threshold; or using the historical path as the final obstacle avoidance path if no collision occurs on the historical path and the ratio of the final cost of the current obstacle avoidance path to the cost of the historical path is greater than a fourth threshold, wherein the collision distance is a shortest longitudinal distance in longitudinal distances of all road points in a collision state on each candidate path.

20. A vehicle, comprising a planning apparatus for planning an obstacle avoidance path of the vehicle, wherein the planning apparatus comprises:

one or more processors; and a memory coupled to the one or more processors and storing instructions, which when executed by the one or more processors, configures the planning apparatus to:

obtain a distance map, wherein the distance map comprises a plurality of first grids, each of the plurality of first grids is used to record a distance from the first grid to a closest first grid occupied by an obstacle; and determine a first horizontal background cost potential field in a near-field range based on the distance map, wherein the near-field range is a range in which a longitudinal distance from the vehicle is less than or equal to a first threshold, the first horizontal background cost potential field is a first repulsion field formed by an obstacle at a horizontal location on the vehicle, the first horizontal background cost potential field comprises a target minimum-value point, background costs on two horizontal sides of the target minimum-value point feature monotonicity, and the background cost represents a near-field horizontal collision cost caused by the obstacle at the horizontal location in the near-field range to the vehicle; and determine a current obstacle avoidance path based on the first horizontal background cost potential field, wherein the vehicle navigates to avoid the obstacle according to the current obstacle avoidance path.

* * * * *